(12) United States Patent
Hsu et al.

(10) Patent No.: US 9,255,795 B2
(45) Date of Patent: Feb. 9, 2016

(54) DISTANCE MEASURING DEVICE WITH INCREASED SIGNAL-TO-NOISE RATIO AND METHOD THEREOF

(71) Applicant: PixArt Imaging Inc., Hsin-Chu (TW)

(72) Inventors: En-Feng Hsu, Hsin-Chu (TW); Yen-Min Chang, Hsin-Chu (TW)

(73) Assignee: PixArt Imaging Inc., Science-Based Industrial Park, Hsin-Chu (TW)

(*) Notice: Subject to any disclaimer, the term of this patent is extended or adjusted under 35 U.S.C. 154(b) by 197 days.

(21) Appl. No.: 13/974,011

(22) Filed: Aug. 22, 2013

(65) Prior Publication Data

US 2013/0335726 A1  Dec. 19, 2013

Related U.S. Application Data

(63) Continuation of application No. 13/046,766, filed on Mar. 13, 2011, now Pat. No. 8,638,425, which is a continuation-in-part of application No. 12/817,172, filed on Jun. 16, 2010, now Pat. No. 8,791,924.

(30) Foreign Application Priority Data

Dec. 3, 2009 (TW) ................................ 098141344
Jul. 29, 2010 (TW) ................................ 099125136

(51) Int. Cl.
*G01C 3/08* (2006.01)
*G01S 7/491* (2006.01)
(Continued)

(52) U.S. Cl.
CPC . *G01C 3/08* (2013.01); *G01S 7/491* (2013.01); *G01S 7/497* (2013.01); *G01S 17/08* (2013.01)

(58) Field of Classification Search
CPC .......... G01S 17/10; G01S 7/497; G01S 17/89
See application file for complete search history.

(56) References Cited

U.S. PATENT DOCUMENTS

| | | | |
|---|---|---|---|
| 5,808,726 | A | 9/1998 | Egawa |
| 5,946,081 | A | 8/1999 | Lai |
| 6,323,942 | B1 | 11/2001 | Bamji |

(Continued)

FOREIGN PATENT DOCUMENTS

| | | |
|---|---|---|
| CN | 101546235 A | 9/2009 |
| TW | 374114 | 11/1999 |

(Continued)

*Primary Examiner* — Luke Ratcliffe
*Assistant Examiner* — Samantha K Abraham
(74) *Attorney, Agent, or Firm* — Winston Hsu; Scott Margo

(57) ABSTRACT

A method of increasing signal-to-noise ratio of a distance-measuring device includes a light-emitting component emitting a detecting light to a measured object during an emitting period for generating a reflected light, a delay period after the light-emitting component emitting the detecting light, a light-sensing component sensing the energy of the reflected light to generate a light-sensing signal, and obtaining a measured distance between the distance-measuring device and the measured object according to the energy of the detecting light and the light-sensing signal. Since the measured distance is longer than a predetermined shortest measured distance, the method can accordingly calculate a proper delay period for ensuring that the reflected light reaches the light-sensing component after the delay period. In this way, the light-sensing component does not sense the background light during the delay period, so that the signal-to-noise ratio of the light-sensing signal is improved.

11 Claims, 21 Drawing Sheets

(51) Int. Cl.
*G01S 7/497* (2006.01)
*G01S 17/08* (2006.01)

(56) References Cited

U.S. PATENT DOCUMENTS

| | | | |
|---|---|---|---|
| 6,678,039 B2 | 1/2004 | Charbon | |
| 6,871,017 B2 * | 3/2005 | Numako | 396/72 |
| 7,006,142 B2 * | 2/2006 | Seo | 348/370 |
| 7,009,690 B2 | 3/2006 | Kamon | |
| 7,186,965 B2 | 3/2007 | Schrey | |
| 7,212,278 B2 | 5/2007 | Doemens | |
| 7,742,637 B2 * | 6/2010 | Xiao et al. | 382/167 |
| 7,847,260 B2 * | 12/2010 | Inbar | 250/370.11 |
| 8,514,375 B2 | 8/2013 | Hsu | |
| 2002/0015144 A1 | 2/2002 | Seo | |
| 2009/0009622 A1 * | 1/2009 | Yoshida et al. | 348/222.1 |
| 2009/0128829 A1 | 5/2009 | Schillke | |
| 2009/0219251 A1 | 9/2009 | Jung | |
| 2009/0244018 A1 | 10/2009 | Lin | |
| 2009/0262098 A1 | 10/2009 | Yamada | |
| 2010/0231692 A1 | 9/2010 | Perlman | |
| 2011/0134222 A1 | 6/2011 | Yahav | |
| 2012/0268727 A1 | 10/2012 | Schrey | |

FOREIGN PATENT DOCUMENTS

| | | |
|---|---|---|
| TW | 200514966 | 5/2005 |
| TW | 200714867 | 4/2007 |
| TW | 200825381 | 6/2008 |
| TW | 200839192 | 10/2008 |
| TW | 200900658 | 1/2009 |
| TW | M364920 | 9/2009 |
| WO | 2009127347 A1 | 10/2009 |

* cited by examiner

DISTANCE MEASURING DEVICE WITH INCREASED SIGNAL-TO-NOISE RATIO AND METHOD THEREOF

CROSS REFERENCE TO RELATED APPLICATIONS

This application is a continuation of U.S. application Ser. No. 13/046,766 filed on Mar. 13, 2011, which is a continuation-in-part of U.S. application Ser. No. 12/817,172, filed on Jun. 16, 2010.

BACKGROUND OF THE INVENTION

1. Field of the Invention

The present invention is related to a distance-measuring device, and more particularly, to distance-measuring device with increased signal-to-noise ratio and method thereof.

2. Description of the Prior Art

In the prior art, the distance-measuring device emits a detecting light to a measured object, and receives the reflected light generated by the measured object reflecting the detecting light. The distance-measuring device calculates the distance between the distance-measuring device and the measured object by means of measuring the period of the detecting light going back and forth between the distance-measuring device and the measured object. However, when the reflectivity of the surface of the measured object is lower, the energy of the reflected light generated by the measured object is lower as well. Thus, the distance-measuring device is easily affected by the background light (noise) so that the distance-measuring device may obtain an incorrect measured distance.

SUMMARY OF THE INVENTION

The present invention provides a method of increasing signal-to-noise ratio of a distance-measuring device. The distance-measuring device is utilized for measuring a measured distance between the distance-measuring device and a measured object. The measured distance is longer than a predetermined shortest measured distance and shorter than a predetermined longest measured distance. The distance-measuring device has a light-emitting component for emitting a detecting light, and a first light-sensing component for sensing and accumulating energy of light to generate a first light-sensing signal according to a first shutter periodic signal. The method comprises the light-emitting component continuously emitting the detecting light to the measured object to generate a reflected light during an emitting period, a delay period after the light-emitting component starts to emit the detecting light, switching the first shutter periodic signal to represent turning-on during a first sensing period for the first light-sensing component sensing and accumulating energy of the reflected light to generate the first light-sensing signal, obtaining a time of flight of light going back and forth between the distance-measuring device and the measured object according to the first light-sensing signal and energy of the detecting light emitted by the light-emitting component during the emitting period, and obtaining the measured distance according to the time of flight. The delay period is calculated according to the predetermined shorted measured distance for the reflected light reaching the first light-sensing component after the delay period.

The present invention further provides a method of increasing signal-to-noise ratio of a distance-measuring device. The distance-measuring device is utilized for measuring a measured distance between the distance-measuring device and a measured object. The measured distance is longer than a predetermined shortest measured distance and shorter than a predetermined longest measured distance. The distance-measuring device has a light-emitting component for emitting a detecting light, a first light-sensing component for sensing and accumulating energy of light according to a first shutter periodic signal to generate a first light-sensing signal, and a second light-sensing component for sensing and accumulating energy of light according to a second shutter periodic signal to generate a second light-sensing signal. The method comprises the light-emitting component continuously emitting the detecting light to the measured object to generate a reflected light during an emitting period, a delay period after the light-emitting component starts to emit the detecting light, switching the first shutter periodic signal to represent turning-on during a first sensing period for the first light-sensing component to sense and accumulate energy of the reflected light to generate the first light-sensing signal, switching the second shutter periodic signal to represent turning-on during a second sensing period for the second light-sensing component to sense and accumulate energy of the reflected light to generate the second light-sensing signal when the first light-sensing component stops sensing the reflected light, obtaining a time of flight of light going back and forth between the distance-measuring device and the measured object according to a ratio of the first light-sensing signal and the second light-sensing signal, and obtaining the measured distance according to the time of flight. The delay period is calculated according to the predetermined shorted measured distance for the reflected light reaching the first light-sensing component after the delay period.

The present invention further provides a method of increasing signal-to-noise ratio of a distance-measuring device. The distance-measuring device is utilized for measuring a measured distance between the distance-measuring device and a measured object. The measured distance is longer than a predetermined shortest measured distance and shorter than a predetermined longest measured distance. The distance-measuring device has a light-emitting component for emitting a detecting light, a light-sensing group for sensing and accumulating energy of light according to a first shutter periodic signal to generate a first light-sensing signal, and sensing and accumulating energy of light according to a second shutter periodic signal to generate a second light-sensing signal. The method comprises switching the light-emitting periodic signal between representing turning-on and turning off with a detecting frequency, for the light-emitting component emitting the detecting light to the measured object to generating a reflected light during an emitting period, and not emitting the detecting light during a non-emitting period, a delay period after every time the light-emitting component starts to emit the detecting light, switching the first shutter periodic signal to represent turning-on during a first sensing period for the light-sensing group to sense and accumulate energy of the reflected light to generate the first light-sensing signal, switching the second shutter periodic signal to represent turning-on during a second sensing period for the light-sensing group to sense and accumulate energy of the reflected light to generate the second light-sensing signal after the first sensing period, obtaining a time of flight of light going back and forth between the distance-measuring device and the measured object according to a ratio of the first light-sensing signal and the second light-sensing signal, and obtaining the measured distance according to the time of flight. The delay period is calculated according to the predetermined shorted measured distance for the reflected light reaching the light-sensing group after the delay period. The light-emitting periodic signal and the first shutter periodic signal are substantially in phase, and a phase of the light-emitting periodic signal is substantially opposite to a phase of the second shutter periodic signal.

The present invention further provides a distance-measuring device with increased signal-to-noise ratio. The distance-measuring device is utilized for measuring a measured distance between the distance-measuring device and a measured object. The measured distance is longer than a predetermined shortest measured distance and shorter than a predetermined longest measured distance. The distance-measuring device comprises an emitting component, a first light-sensing component, a light-emitting/sensing controlling circuit, and a distance-calculating circuit. The emitting component is utilized for emitting a detecting light. The first light-sensing component is utilized for sensing and accumulating energy of light according to a first shutter periodic signal to generate a first light-sensing signal. The light-emitting/sensing controlling circuit is utilized for controlling the emitting component continuously emitting the detecting light to the measured object to generate a reflected light during an emitting period. A delay period after the light-emitting component starts to emit the detecting light, the light-emitting/sensing controlling circuit switches the first shutter periodic signal representing turning-on during a first sensing period for the first light-sensing component to sense and accumulate energy of the reflected light to generate the first light-sensing signal. The light-emitting/sensing controlling circuit calculates the delay period according to the predetermined shortest measured distance for the reflected light reaching the first light-sensing component after the delay period. The distance-calculating circuit is utilized for obtaining a time of flight of light going back and forth between the distance-measuring device and the measured object according to the first light-sensing signal and energy of the detecting light emitted by the light-emitting component during the emitting period, and generating an output signal representing the measured distance according to the time of flight.

The present invention further provides a distance-measuring device with increased signal-to-noise ratio. The distance-measuring device is utilized for measuring a measured distance between the distance-measuring device and a measured object. The measured distance is longer than a predetermined shortest measured distance and shorter than a predetermined longest measured distance. The distance-measuring device comprises an emitting component, a first light-sensing component, a second light-sensing component, a light-emitting/sensing controlling circuit, and a distance-calculating circuit. The emitting component is utilized for emitting a detecting light. The first light-sensing component is utilized for sensing and accumulating energy of light according to a first shutter periodic signal to generate a first light-sensing signal. The second light-sensing component is utilized for sensing and accumulating energy of light according to a second shutter periodic signal to generate a second light-sensing signal. The light-emitting/sensing controlling circuit is utilized for controlling the emitting component continuously emitting the detecting light to the measured object to generate a reflected light during an emitting period. A delay period after the light-emitting component starts to emit the detecting light, the light-emitting/sensing controlling circuit switches the first shutter periodic signal representing turning-on during a first sensing period for the first light-sensing component to sense and accumulate energy of the reflected light to generate the first light-sensing signal. When the first light-sensing component stops sensing the reflected light, the light-emitting/sensing controlling circuit switches the second shutter periodic signal representing turning-on during a second sensing period for the second light-sensing component to sense and accumulate energy of the reflected light to generate the second light-sensing signal. The light-emitting/sensing controlling circuit calculates the delay period according to the predetermined shortest measured distance for the reflected light reaching the first light-sensing component after the delay period. The distance-calculating circuit is utilized for obtaining a time of flight of light going back and forth between the distance-measuring device and the measured object according to a ratio between the first light-sensing signal and the second light-sensing signal, and generating an output signal representing the measured distance according to the time of flight.

The present invention further provides a distance-measuring device with increased signal-to-noise ratio. The distance-measuring device is utilized for measuring a measured distance between the distance-measuring device and a measured object. The measured distance is longer than a predetermined shortest measured distance and shorter than a predetermined longest measured distance. The distance-measuring device comprises an emitting component, a light-sensing group, a light-emitting/sensing controlling circuit, and a distance-calculating circuit. The emitting component is utilized for emitting a detecting light. The light-sensing group is utilized for sensing and accumulating energy of light according to a first shutter periodic signal to generate a first light-sensing signal, and sensing and accumulating energy of light according to a second shutter periodic signal to generate a second light-sensing signal. The light-emitting/sensing controlling circuit is utilized for switching the light-emitting periodic signal between representing turning-on and turning off with a detecting frequency, for the light-emitting component emitting the detecting light to the measured object to generating a reflected light during an emitting period, and not emitting the detecting light during a non-emitting period. A delay period after every time the light-emitting component starts to emit the detecting light, the light-emitting/sensing controlling circuit switches the first shutter periodic signal to represent turning-on during a first sensing period for the light-sensing group to sense and accumulate energy of the reflected light to generate the first light-sensing signal. After the first sensing period, the light-emitting/sensing controlling circuit switches the second shutter periodic signal to represent turning-on during a second sensing period for the light-sensing group to sense and accumulate energy of the reflected light to generate the second light-sensing signal. The light-emitting periodic signal and the first shutter periodic signal are substantially in phase, and a phase of the light-emitting periodic signal is substantially opposite to a phase of the second shutter periodic signal. The light-emitting/sensing controlling circuit calculates the delay period according to the predetermined shortest measured distance for the reflected light reaching the first light-sensing component after the delay period. The distance-calculating circuit is utilized for obtaining a time of flight of light going back and forth between the distance-measuring device and the measured object according to a ratio between the first light-sensing signal and the second light-sensing signal, and generating an output signal representing the measured distance according to the time of flight.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
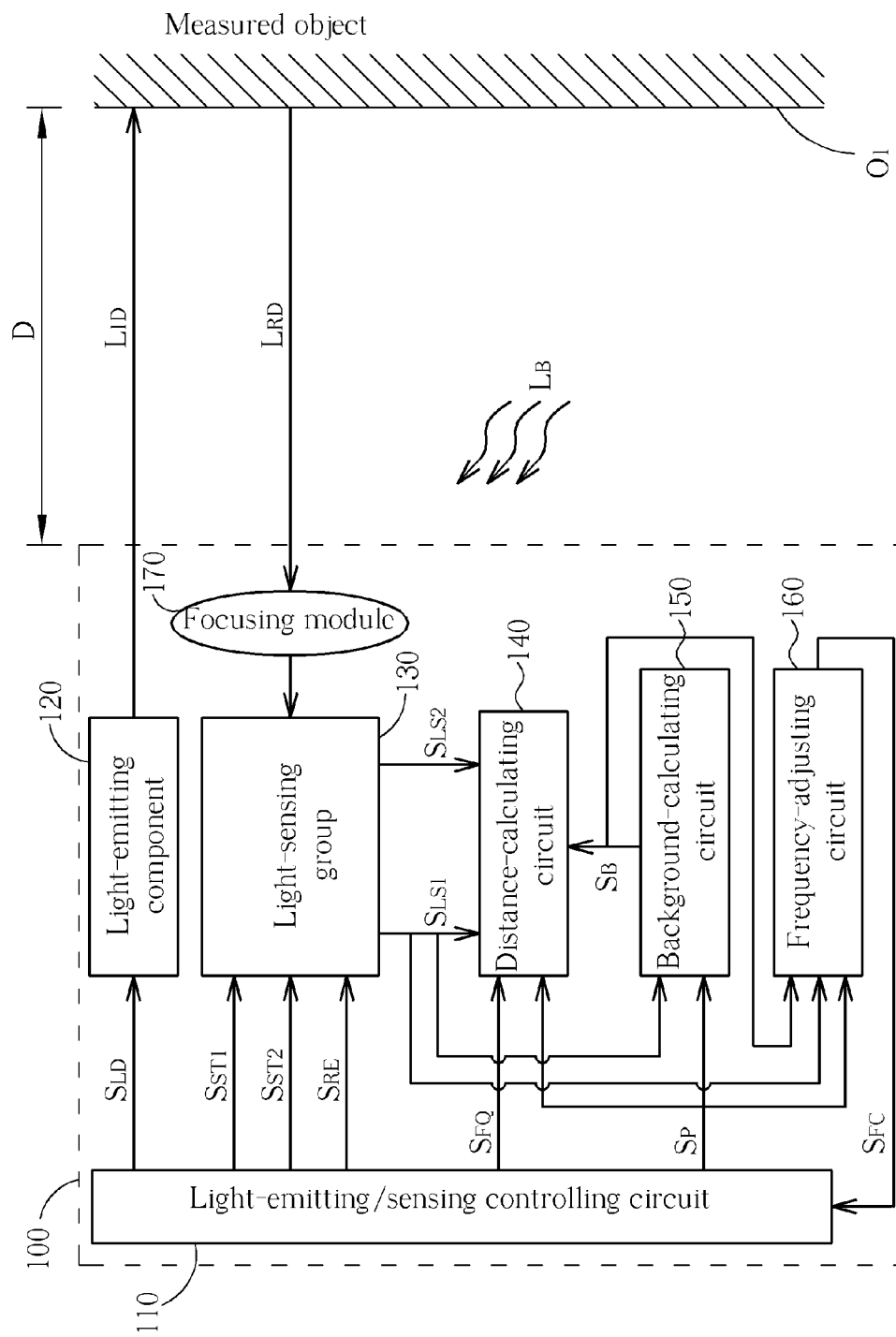
FIG. 1 is a diagram illustrating a distance-measuring device according to a first embodiment of the present invention.

Please refer to FIG. 1. FIG. 1 is a diagram illustrating a distance-measuring device 100 according to a first embodiment of the present invention. The distance-measuring device 100 is utilized for measuring the measured distance D, wherein the measured distance D is the distance between the measured object $O_1$ and the distance-measuring device 100, as shown in FIG. 1. The distance-measuring device 100 comprises a light-emitting/sensing controlling circuit 110, a light-emitting component 120, a light-sensing group 130, a distance-calculating circuit 140, a background-calculating circuit 150, a frequency-adjusting circuit 160, and a focusing module 170.

The light-emitting/sensing controlling circuit 110 is utilized for generating a light-emitting periodic signal $S_{LD}$, shutter periodic signals $S_{ST1}$ and $S_{ST2}$, a phase signal $S_P$, a frequency-detecting signal $S_{FQ}$, and a reading signal $S_{RE}$. The light-emitting periodic signal $S_{LD}$, and the shutter periodic signals $S_{ST1}$ and $S_{ST2}$ have the same frequency. The frequency-detecting signal $S_{FQ}$ indicates the magnitude of the frequency of the light-emitting periodic signal $S_{LD}$, and the shutter periodic signals $S_{ST1}$ and $S_{ST2}$, which means when a device receives the frequency-detecting signal $S_{FQ}$, the device obtains the magnitude of the frequency of the light-emitting periodic signal $S_{LD}$. In addition, the phases of the light-emitting periodic signal $S_{LD}$ and the shutter periodic signal $S_{ST1}$ are approximately the same (in phase), and the phase of the light-emitting periodic signal $S_{LD}$ is approximately opposite to that of the shutter periodic signal $S_{ST2}$.

The light-emitting component 120 may be a Light-Emitting Diode (LED). The light-emitting component 120 emits a detecting light $L_{ID}$ to the measured object $O_1$ according to the light-emitting periodic signal $S_{LD}$. For example, when the light-emitting periodic signal $S_{LD}$ represents "emitting", the light-emitting component 120 emits the detecting light $L_{ID}$; otherwise, when the light-emitting periodic signal $S_{LD}$ represents "not-emitting", the light-emitting component 120 does not emit the detecting light $L_{ID}$.

The focusing module 170 is utilized for focusing the reflected light $L_{RD}$, which is generated by the measured object $O_1$ reflecting the detecting light $L_{ID}$, to the light-sensing group 130.

The light-sensing group 130 is a Charge Coupled Device (CCD) or a Complementary Metal-Oxide-Semiconductor (CMOS) light sensor. The light-sensing group 130 senses and accumulates the energy of the reflected light $L_{RD}$ according to the shutter periodic signal $S_{ST1}$. In addition, the light-sensing group 130 outputs the light-sensing signal $S_{LS1}$ according to the reading signal $S_{RE}$. For instance, when the shutter periodic signal $S_{ST1}$ represents "turning-on", the light-sensing group 130 senses the energy of the reflected light $L_{RD}$ so as to accordingly accumulate the energy $E_{R1}$; when the shutter periodic signal $S_{ST1}$ represents "turning-off", the light-sensing group 130 does not sense the energy of the reflected light $L_{RD}$, and does not accumulate the energy $E_{R1}$. When the reading signal $S_{RE}$ represents "reading", the light-sensing group 130 outputs the light-sensing signal $S_{LS1}$ according to the accumulated energy $E_{R1}$. Besides, the light-sensing group 130 also senses and accumulates the energy of the reflected light $L_{RD}$ according to the shutter periodic signal $S_{ST2}$, and the light-sensing group 130 outputs the light-sensing signal $S_{LS2}$ according to the reading signal $S_{RE}$ as well. For instance, when the shutter periodic signal $S_{ST2}$ represents "turning-on", the light-sensing group 130 senses the energy of the reflected light $L_{RD}$ so as to accordingly accumulate the energy $E_{R2}$; when the shutter periodic signal $S_{ST2}$ represents "turning-off", the light-sensing group 130 does not sense the energy of the reflected light $L_{RD}$, and does not accumulate the energy $E_{R2}$. When the reading signal $S_{RE}$ represents "reading", the light-sensing group 130 outputs the light-sensing signal $S_{LS2}$ according to the accumulated energy $E_{R2}$. In addition, it is noticeable that after the light-sensing group 130 outputs the light-sensing signals $S_{LS1}$ and $S_{LS2}$ according to the reading signal $S_{RE}$ representing "reading", the light-sensing group 130 resets the accumulated energy $E_{R1}$ and $E_{R2}$ (which means the light-sensing group 130 releases the accumulated energy $E_{R1}$ and $E_{R2}$)

The background-calculating circuit 150 outputs the background signal $S_B$ according to the phase signal $S_P$ and the light-sensing signal $S_{LS1}$.

The frequency-adjusting circuit 160 outputs the frequency-controlling signal $S_{FC}$ according to the phase signal $S_P$ and the light-sensing signal $S_{LS1}$. The distance-calculating circuit 140 calculates the measured distance D between the measured object $O_1$ and the distance-measuring device 100 according to the phase signal $S_P$, the background signal $S_B$, the light-sensing signals $S_{LS1}$ and $S_{LS2}$, and the frequency-detecting signal $S_{FQ}$.

When the distance-measuring device 100 measures the measured distance D, the measuring process includes a "background-measuring phase", a "frequency-adjusting phase", and a "distance-calculating phase". The operation principle of each phase is illustrated in detail as below.

Figure 2:
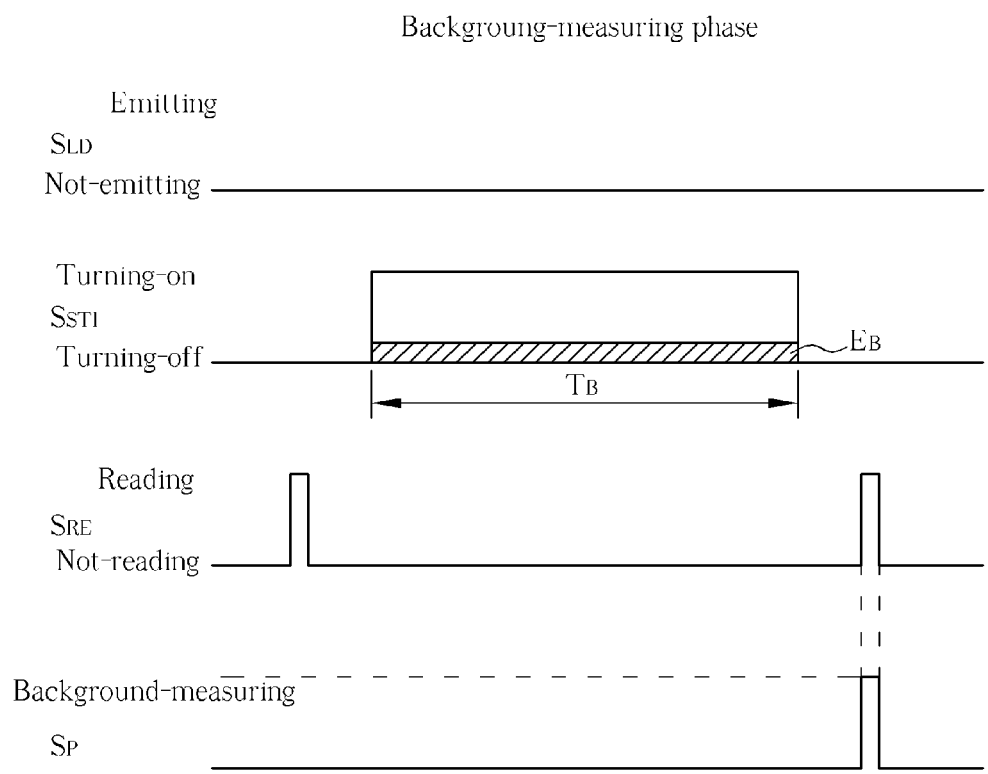
FIG. 2 is a waveform diagram of the control signals of the distance-measuring device in the "background-measuring phase".

Please refer to FIG. 2. FIG. 2 is a waveform diagram of the control signals of the distance-measuring device 100 in the "background-measuring phase". When the distance-measuring device 100 enters the "background-measuring phase", the distance-measuring device 100 measures the energy of the background light $L_B$ sensed by the light-sensing group 130 per unit time, so that the distance-measuring device 100 can reduce the effect of the background light $L_B$ in the "distance-calculating phase". At the beginning of the "background-measuring phase", the light-emitting/sensing controlling circuit 110 generates the reading signal $S_{PE}$ representing "reading" so as to reset the accumulated energy of the light-sensing group 130. Then, the light-emitting/sensing controlling circuit 110 generates the shutter periodic signal $S_{ST1}$ having a pulse width $T_B$, wherein $T_B$ represents a background-measuring period. Meanwhile, since the light-emitting periodic signal $S_{LD}$ represents "not-emitting", the light-emitting component 120 does not emit the detecting light $L_{ID}$. Hence, instead of the light-sensing group 130 sensing the energy of the reflected light $L_{RD}$, the light-sensing group 130 only senses the energy of the background light $L_B$ so as to accumulate the energy $E_B$ corresponding to the background light $L_B$. After the background-measuring period $T_B$, the shutter periodic signal $S_{ST1}$ change to be "turning-off". Meanwhile, the light-emitting/sensing controlling circuit 110 simultaneously generates the reading signal $S_{RE}$ representing "reading" and the phase signal $S_P$ representing "background-measuring", so that the light-sensing group 130 outputs the light-sensing signal $S_{LS1}$ according to the accumulated energy $E_B$, and the background-calculating circuit 150 outputs the background signal $S_B$ to the distance-calculating circuit 140 according to the frequency-detecting signal $S_{FQ}$, and the light-sensing signal $S_{LS1}$. The value of the background signal $S_B$ represents the energy of the background light $L_B$ sensed by the light-sensing group 130 per unit time and can be represented as the following formula:

$$S_B = E_B/T_B \quad (1);$$

wherein $E_B$ is the total energy accumulated by the light-sensing group 130 sensing the background light $L_B$ in the background-measuring period $T_B$.

Figure 3:
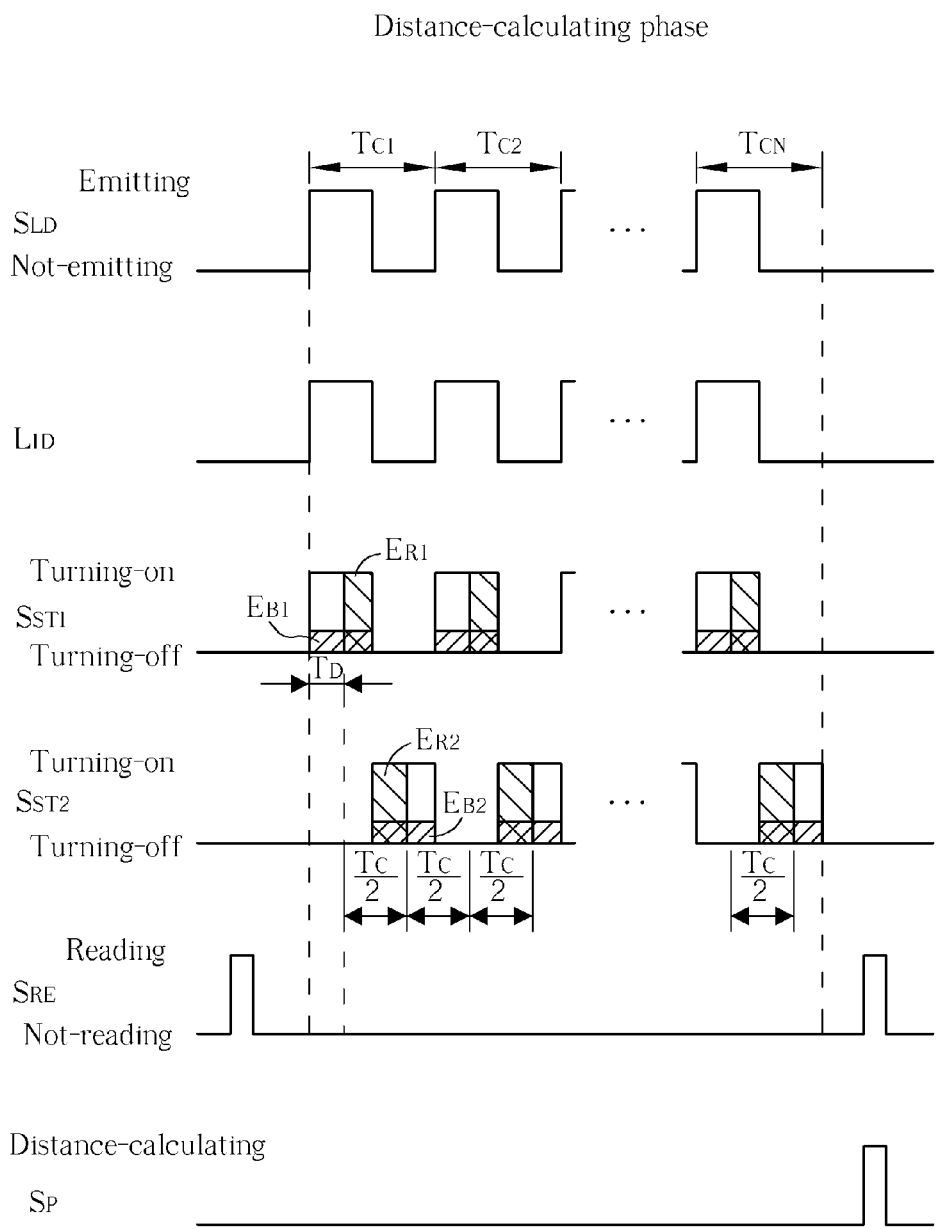
FIG. 3 is a waveform diagram of the control signals of the distance-measuring device in the "distance-calculating phase".

Please refer to FIG. 3. FIG. 3 is a waveform diagram of the control signals of the distance-measuring device 100 in the "distance-calculating phase". When the distance-measuring device 100 enters the "distance-calculating phase", the distance-measuring device 100 controls the light-emitting component 120 emitting the detecting light $L_{ID}$ by means of the light-emitting periodic signal $S_{LD}$ of the detecting frequency $F_C$, and the distance-measuring device 100 calculates the period length of the light going back and forth between the measured object $O_1$ and the distance-measuring device 100, by means of the light-sensing group 130 sensing the energy of the reflected light $L_{RD}$, so as to obtain the measured distance D. At the beginning of the "distance-calculating phase", the light-emitting/sensing controlling circuit 110 generates the reading signal $S_{RE}$ representing "reading" to reset the accumulated energy of the light-sensing group 130. Then, the light-emitting/sensing controlling circuit 110 generates the shutter periodic signals $S_{ST1}$ and $S_{ST2}$, and the light-emitting periodic signals $S_{LD}$ with the detecting frequency $F_C$ in the detecting cycles $T_{C1} \sim T_{CN}$. Therefore, in the detecting cycles $T_{C1} \sim T_{CN}$, the shutter periodic signals $S_{ST1}$ and $S_{ST2}$ repeat being switched between "turning-on" and "turning-off", and the light-emitting periodic signals $S_{LD}$ repeats being switched between "emitting" and "not-emitting". The period length of each detecting cycle $T_{C1} \sim T_{CN}$ is equal to a detecting cycle $T_C$, wherein the value of the detecting cycle $T_C$ is the inverse of the detecting frequency $F_C$. In the detecting cycles $T_{C1} \sim T_{CN}$, the phases of the light-emitting periodic signal $S_{LD}$ and the shutter periodic signal $S_{ST1}$ are approximately the same (in phase), and the phase of the shutter periodic signal $S_{ST1}$ is opposite to that of the shutter periodic signal $S_{ST2}$. More particularly, in the detecting cycles $T_{C1} \sim T_{CN}$, when the light-emitting periodic signal $S_{LD}$ represents "emitting", the shutter periodic signal $S_{ST1}$ represents "turning-on" and the shutter periodic signal $S_{ST2}$ represents "turning-off"; when the light-emitting periodic signal $S_{LD}$ represents "not-emitting", the shutter periodic signal $S_{ST1}$ represents "turning-off" and the shutter periodic signal $S_{ST2}$ represents "turning-on". In this way, in the first-half cycles of the detecting cycles $T_{C1} \sim T_{CN}$, the light-emitting component 120 emits the detecting light $L_{ID}$ and the light-sensing group 130 senses the energy of the reflected light $L_{RD}$ so as to accumulate the energy $E_{R1}$; and in the second-half cycles of the detecting cycles $T_{C1} \sim T_{CN}$, the light-sensing group 130 senses the energy of the reflected light $L_{RD}$ so as to accumulate the energy $E_{R2}$.

After the detecting cycles $T_{C1} \sim T_{CN}$, the light-emitting/sensing controlling circuit 110 simultaneously generates the reading signal $S_{RE}$ representing "reading" and the phase signal $S_P$ representing "distance-calculating", so that the light-sensing group 130 outputs the light-sensing signal $S_{LS1}$ to the distance-calculating circuit 140 according to the accumulated energy $E_{R1}$ and $E_{B1}$ and outputs the light-sensing signal $S_{LS2}$ to the distance-calculating circuit 140 according to the accumulated energy $E_{R2}$ and $E_{B2}$, wherein the accumulated energy $E_{R1}$ is generated by the light-sensing group 130 sensing the reflected light $L_{RD}$ in the first-half cycles of the detecting cycles $T_{C1} \sim T_{CN}$; the accumulated energy $E_{B1}$ is generated by the light-sensing group 130 sensing the background light $L_B$ in the first-half cycles of the detecting cycles $T_{C1} \sim T_{CN}$; the accumulated energy $E_{R2}$ is generated by the light-sensing group 130 sensing the reflected light $L_{RD}$ in the second-half cycles of the detecting cycles $T_{C1} \sim T_{CN}$; and the accumulated energy $E_{B2}$ is generated by the light-sensing group 130 sensing the background light $L_B$ in the second-half cycles of the detecting cycles $T_{C1} \sim T_{CN}$. The distance-calculating circuit 140 calculates the measured distance D between the measured object $O_1$ and the distance-measuring device 100 according the frequency-detecting signal $S_{FQ}$, the light-sensing signals $S_{LS1}$ and $S_{LS2}$, and the background signal $S_B$, wherein the values of the light-sensing signals $S_{LS1}$ and $S_{LS2}$ are respectively equal to $(E_{R1}+E_{B1})$ and $(E_{R2}+E_{B2})$, and the value of the frequency-detecting signal $S_{FQ}$ is equal to the detecting frequency $F_C$. The operation principle of calculating measured distance D is illustrated as below.

It can be seen in FIG. 3 that a round-trip period $T_D$ after the light-emitting component 120 emitting the detecting light $L_{ID}$, the light-sensing group 130 starts to sense the reflected light $L_{RD}$ (that is, the reflected light $L_{RD}$ reaches the light-sensing group 130). In other words, the round-trip period $T_D$ is the sum of the period of the detecting light $L_{ID}$ flying from the light-emitting component 120 to the measured object $O_1$ and the period of the reflected light $L_{RD}$ flying from the measured object $O_1$ to the light-sensing group (that is, the time the light going back and forth between the measured object $O_1$ and the distance-measuring device 100). Since the period length of the light-sensing group 130 sensing the reflected light $L_{RD}$ to accumulate energy $E_{R1}$ in the first-half cycle of the detecting cycle $T_{C1}$ is $[(T_C/2)-T_D]$ and the pulse width of the detecting light $L_{ID}$ is equal to $(T_C/2)$, the period length of the light-sensing group 130 sensing the reflected light $L_{RD}$ to accumulate energy $E_{R2}$ in the second-half cycle of the detecting cycle $T_{C1}$ is equal to the period length of the pulse width of the detecting light $L_{ID}$ deducting the period of the light-sensing group 130 sensing the reflected light $L_{RD}$ to accumulate energy $E_{R1}$ in the first-half cycle of the detecting cycle $T_{C1}$. That is, the period length of the light-sensing group 130 sensing the reflected light $L_{RD}$ to accumulate energy $E_{R2}$ in the second-half cycle of the detecting cycle $T_{C1}$ is equal to that of the round-trip period $T_D$. In the detecting cycles $T_{C1} \sim T_{CN}$, since the light-emitting/sensing controlling circuit 110 generates the light-emitting periodic signal $S_{LD}$, and the shutter periodic signals $S_{ST1}$ and $S_{ST2}$ with the "fixed" detecting frequency $F_C$, the period length of the light-sensing group 130 sensing the reflected light $L_{RD}$ to accumulate the energy $E_{R1}$ in each first-half cycle is equal to $[(T_C/2)-T_D]$, and the period length of the light-sensing group 130 sensing the reflected light $L_{RD}$ to accumulate the energy $E_{R2}$ in each second-half cycle is equal to $T_D$. In this way, the ratio between the accumulated energy $E_{R1}$ and $E_{R2}$ is equal to $[(T_C/2)-T_D]/T_D$. As a result, the relation between the round-trip period $T_D$, the light-sensing signals $S_{LS1}$ and $S_{LS2}$, the detecting frequency $F_C$, and the background signal $S_B$ can be represented as the following formula:

$$\begin{aligned}
T_D &= (T_C/2) \times [E_{R2}/(E_{R1}+E_{R2})] \quad (2)\\
&= [1/(2 \times F_C)] \times [(S_{LS2}-E_{B2})/(S_{LS1}-E_{B1}+S_{LS2}-E_{B2})]\\
&= [1/(2 \times F_C)] \times [(S_{LS2}-E_{B2})/(S_{LS1}-E_{B1}+S_{LS2}-E_{B2})]\\
&= [1/(2 \times F_C)] \times [(S_{LS2}-S_B/(2 \times F_C))/\\
&\quad (S_{LS1}+S_{LS2}-S_B/F_C)];
\end{aligned}$$

since the round-trip period $T_D$ is the time of the light going back and forth between the measured object $O_1$ and the distance-measuring device 100, the measured distance D can be represented as the following formula:

$$\begin{aligned}
D &= T_D \times C/2 \quad (3)\\
&= [C/(4 \times F_C)] \times [(S_{LS2}-S_B/(2 \times F_C))/\\
&\quad (S_{LS1}+S_{LS2}-S_B/F_C)];
\end{aligned}$$

wherein C represents the light speed, N represents the number of the detecting cycles in the "distance-calculating phase".

In addition, it is noticeable, in the "distance-calculating phase", when N is equal to 1, it means the light-sensing group 130 senses the reflected light $L_{RD}$ in only one detecting cycle to accumulate the energy $E_{R1}$ and $E_{R2}$. However, if the reflectivity of the measured object $O_1$ is lower or the measured distance D is longer, the energy of the reflected light $L_{RD}$ becomes lower. In this way, the accumulated energy $E_{R1}$ and $E_{R2}$ of the light-sensing group 130 is so small that the measuring error may become too large to cause the distance-measuring device 100 obtains an incorrect measured distance. When N becomes larger, the light-sensing group 130 senses the reflected light $L_{RD}$ in more detecting cycles to accumulate the energy $E_{R1}$ and $E_{R2}$, so that the energy $E_{R1}$ and $E_{R2}$ becomes larger. In this case, even if the reflectivity of the measured object $O_1$ is lower or the measured distance D is longer, the accumulated energy still can be raised up to be large enough by increasing the number of the detecting cycles, so that the measuring error can be reduced.

In addition, in the "distance-calculating phase", the measured distance D is calculated according to the round-trip period $T_D$ of the formula (2). However, if the measured distance D between the distance-measuring device 100 and the measured object $O_1$ is too long, it may causes the round-trip period $T_D$ is longer than a half of the detecting cycle $T_C$. That is, in the first-half cycle of the detecting cycle $T_{C1}$, the light-sensing group does not sense the reflected light $L_{RD}$ to accumulate the energy $E_{R1}$. In this way, the ratio between the accumulated energy $E_{R1}$ and $E_{R2}$ is not equal to $[(T_C/2)-T_D]/T_D$, so that the distance-calculating circuit 140 can not correctly calculate the measured distance D according to the formula (3). Consequently, the present invention provide a method ("frequency-adjusting phase") for the distance-measuring device 100 adjusting the detecting cycle $T_C$ (or the detecting frequency $F_C$) before the "distance-calculating phase", so as to assure that the round-trip period $T_D$ is shorter than a half of the detecting cycle $T_C$ and the distance-calculating circuit 140 can correctly calculate the measured distance D according to the formula (3).

Figure 4:
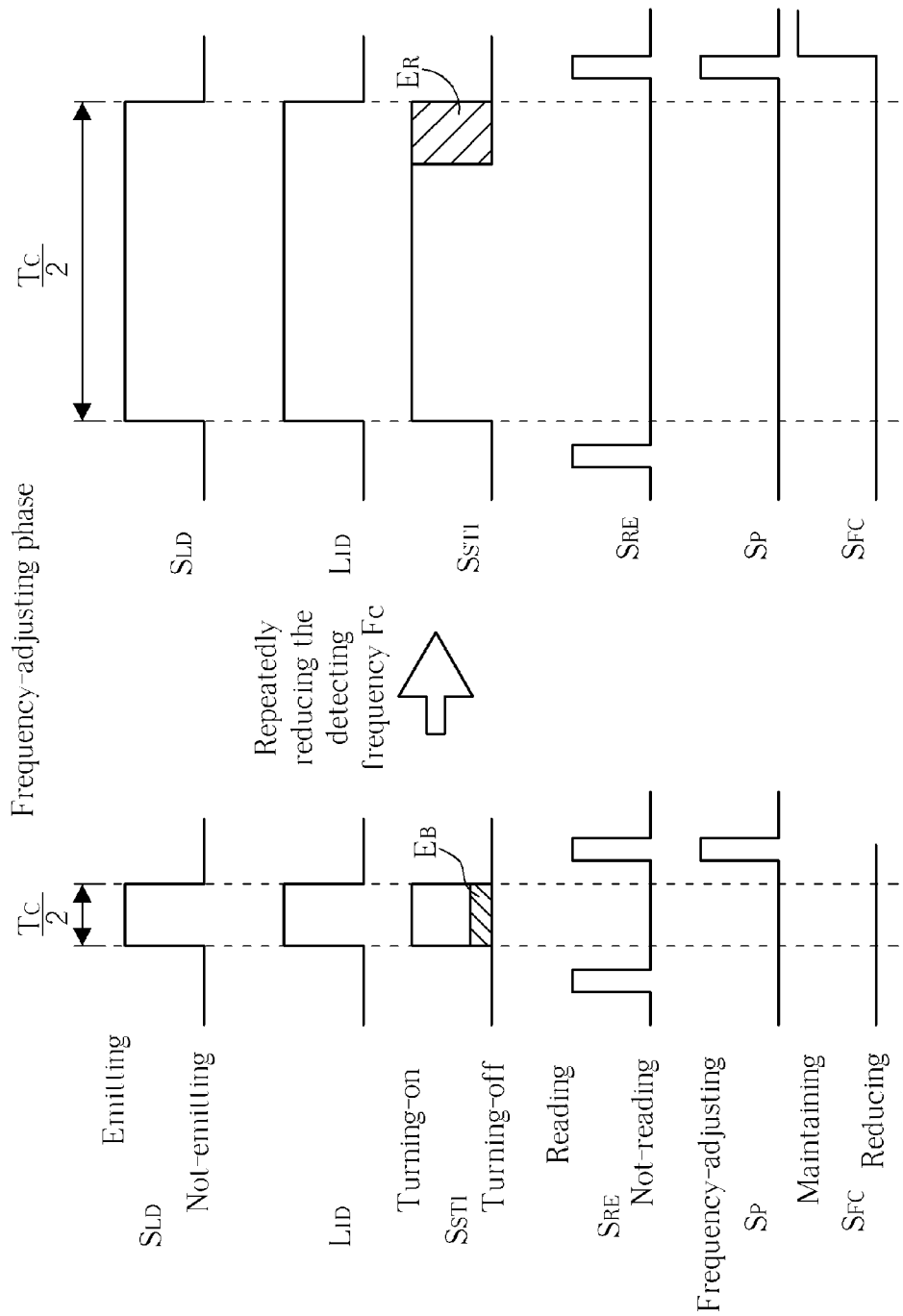
FIG. 4 is a waveform diagram of the control signals of the distance-measuring device in the "frequency-adjusting phase".

Please refer to FIG. 4. FIG. 4 is a waveform diagram of the control signals of the distance-measuring device 100 in the "frequency-adjusting phase". As shown in the left part of FIG. 4, when the distance-measuring device 100 enters the "frequency-adjusting phase", the light-emitting/sensing controlling circuit 110 generates the reading signal $S_{RE}$ representing "reading" so as to reset the accumulated energy of the light-sensing group 130. After that, the light-sensing/emitting controlling circuit 110 simultaneously generates the light-emitting periodic signal $S_{LD}$, which is representing "emitting" and having a pulse width $(T_C/2)$, and the shutter periodic signal $S_{ST1}$, which is representing "turning-on" and having a pulse width $(T_C/2)$. Finally, the light-emitting/sensing controlling circuit 110 generates the reading signal $S_{RE}$ representing "reading" and the phase signal $S_P$ representing "frequency-adjusting", so that the light-sensing group 130 outputs the light-sensing signal $S_{LS1}$ according to the energy $E_R$ accumulated by the light-sensing group 130 sensing the reflected light $L_{RD}$ and the energy $E_B$ accumulated by light-sensing group 130 sensing the background light $L_B$ (more particularly, $S_{LS1}=E_B+E_R$). The frequency-adjusting circuit 160 outputs the frequency-controlling signal $S_{FC}$ according to the light-sensing signal $S_{LS1}$ and the background signal $S_B$. It can be seen in FIG. 4 that when the round-trip period $T_D$ of the light going back and forth between the distance-measuring device 100 and the measured object $O_1$ is shorter than $(T_C/2)$, it means that the reflected light $L_{RD}$ can reach the light-sensing group 130 before the end of the period of the shutter periodic signal $S_{ST1}$ representing "turning-on". Therefore, the light-sensing group 130 can sense the reflected light $L_{RD}$ so as to accumulate the energy $E_R$. When the round-trip period $T_D$ is longer than $(T_C/2)$, it means that the reflected light $L_{RD}$ can not reach the light-sensing group 130 in time. Thus, the light-sensing group 130 can not sense the reflected light $L_{RD}$ and can not accumulate the energy $E_R$. In addition, the energy $E_R$ can be represented as the following formula:

$$E_R = S_{LS1} - S_R/(2 \times F_C) \quad (4);$$

hence, when the frequency-adjusting circuit 160 determines that the accumulated energy $E_R$ is smaller or equal to a predetermined threshold energy $E_{TH}$ (for example, $E_{TH}$ is zero) according to formula (4), it means the round-trip period $T_D$ is longer than $(T_C/2)$ and the reflected light $L_{RD}$ can not reach the light-sensing group 130 in time. Meanwhile, the frequency-adjusting circuit 160 outputs the frequency-controlling signal $S_{FC}$ representing "reducing" so as to control the light-emitting/sensing controlling circuit 110 reducing the detecting frequency $F_C$ (that is, increasing the detecting cycle $T_C$). After the light-emitting/sensing controlling circuit 110 reduces the detecting frequency $F_C$, The light-emitting/sensing controlling circuit 110 repeats the above-mentioned process again to determine if the round-trip period $T_D$ is shorter than ($T_C/2$) (that is, the reflected light $L_{RD}$ can reach the light-sensing group 130 in time). When the frequency-adjusting circuit 160 determines the accumulated energy $E_R$ is larger than the predetermined threshold energy $E_{TH}$, it represents that the round-trip period $T_D$ is shorter than ($T_C/2$). Meanwhile, the frequency 160 outputs the frequency-controlling signal $F_C$ representing "maintaining" so as to control the light-emitting/sensing controlling circuit 110 keeping the detecting frequency $F_C$ unchanged and finish the "frequency-adjusting phase". In this way, the device-measuring device 100 assures the round-trip period $T_D$ is shorter than ($T_C/2$) (that is, the reflected light $L_{RD}$ can reach the light-sensing group 130 in time) by means of the frequency-adjusting circuit 160 adjusting the detecting frequency $F_C$ in the "frequency-adjusting phase".

In conclusion, In the "background-measuring phase", the light-sensing group 130 senses the background light $L_B$, so that the distance-measuring device 100 can calculates the energy accumulated by the light-sensing group 130 sensing the background light $L_B$ per unit time; In the "frequency-adjusting phase", the distance-measuring device 100 reduces the detecting frequency $F_C$ until the round-trip period $T_D$ is shorter than ($T_C/2$) (that is, the reflected light $L_{RD}$ can reach the light-sensing group 130 in time); in the "distance-calculating phase" the distance-measuring device 100 calculates the measured distance D, by means of the formula (3), according to the background signal $S_B$, the frequency-detecting signal $S_{FQ}$, and the light-sensing signals $S_{LS1}$ and $S_{LS2}$, which are outputted by the light-sensing group 130 sensing the reflected light in detecting cycles $T_{C1} \sim T_{CN}$. The distance-measuring device 100 calibrates the ratio between the light-sensing signals $S_{LS1}$ and $S_{LS2}$ according to the background signal $S_B$. In this way, the distance-measuring device 100 reduces the effect of the background light $L_B$ and the measuring error when the measured distance D is too long or when the reflectivity of the measured object $O_1$ is too low, so that the distance-measuring device 100 can more correctly calculate the measured distance D.

Figure 5:
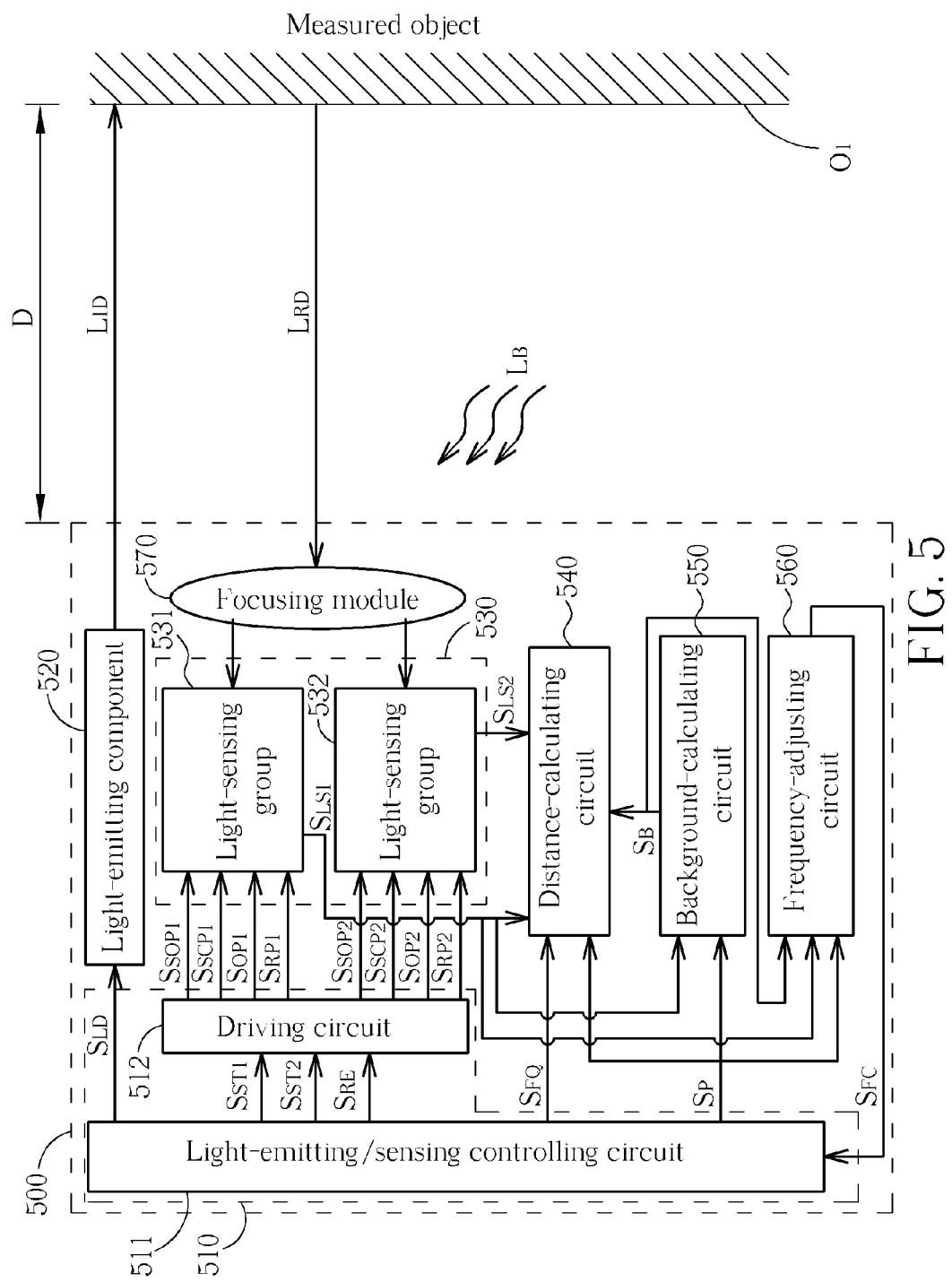
FIG. 5 is a diagram illustrating a distance-measuring device according to a second embodiment of the present invention.

Please refer to FIG. 5. FIG. 5 is a diagram illustrating a distance-measuring device 500 according to a second embodiment of the present invention. The structure and the operation principle of the light-emitting/sensing controlling circuit 511, the light-emitting component 520, the distance-calculating circuit 540, the background-calculating circuit 550, the frequency-adjusting circuit 560, and the focusing module 570 are respectively similar to those of the light-emitting/sensing controlling circuit 110, the light-emitting component 120, the distance-calculating circuit 140, the background-calculating circuit 150, the frequency-adjusting circuit 160, and the focusing module 170, and will not be repeated again for brevity. Compared with the distance-measuring device 100, the distance-measuring device 500 comprises a light-emitting/sensing module 510. The light-emitting/sensing module 510 includes the light-emitting/sensing controlling circuit 511, and a driving circuit 512. The driving circuit 512 generates shutter-on pulse signals $S_{SOP1}$ and $S_{SOP2}$, shutter-off pulse signals $S_{SCP1}$ and $S_{SCP2}$, reset pulse signals $S_{RP1}$ and $S_{RP2}$, and output pulse signals $S_{OP1}$ and $S_{OP2}$ according to the shutter periodic signals $S_{ST1}$ and $S_{ST2}$, and the reading signal $S_{RE}$. The light-sensing group 530 comprises light-sensing components 531 and 532. The light-sensing component 531 senses the background light $L_B$ or the reflected light $L_{RD}$ to accumulate the energy according to the shutter-on pulse signal $S_{SOP1}$, and the shutter-off pulse signal $S_{SCP1}$; the light-sensing component 531 outputs the light-sensing signal $S_{LS1}$ according to the output pulse signal $S_{OP1}$ and the accumulated energy; and the light-sensing component 531 resets the accumulated energy according to the reset pulse signal $S_{RP1}$. Similarly, the light-sensing component 532 senses the background light $L_B$ or the reflected light $L_{RD}$ to accumulate the energy according to the shutter-on pulse signal $S_{SOP2}$, and the shutter-off pulse signal $S_{SCP2}$; the light-sensing component 532 outputs the light-sensing signal $S_{LS2}$ according to the output pulse signal $S_{OP2}$ and the accumulated energy; and the light-sensing component 532 resets the accumulated energy according to the reset pulse signal $S_{RP2}$.

Figure 6:
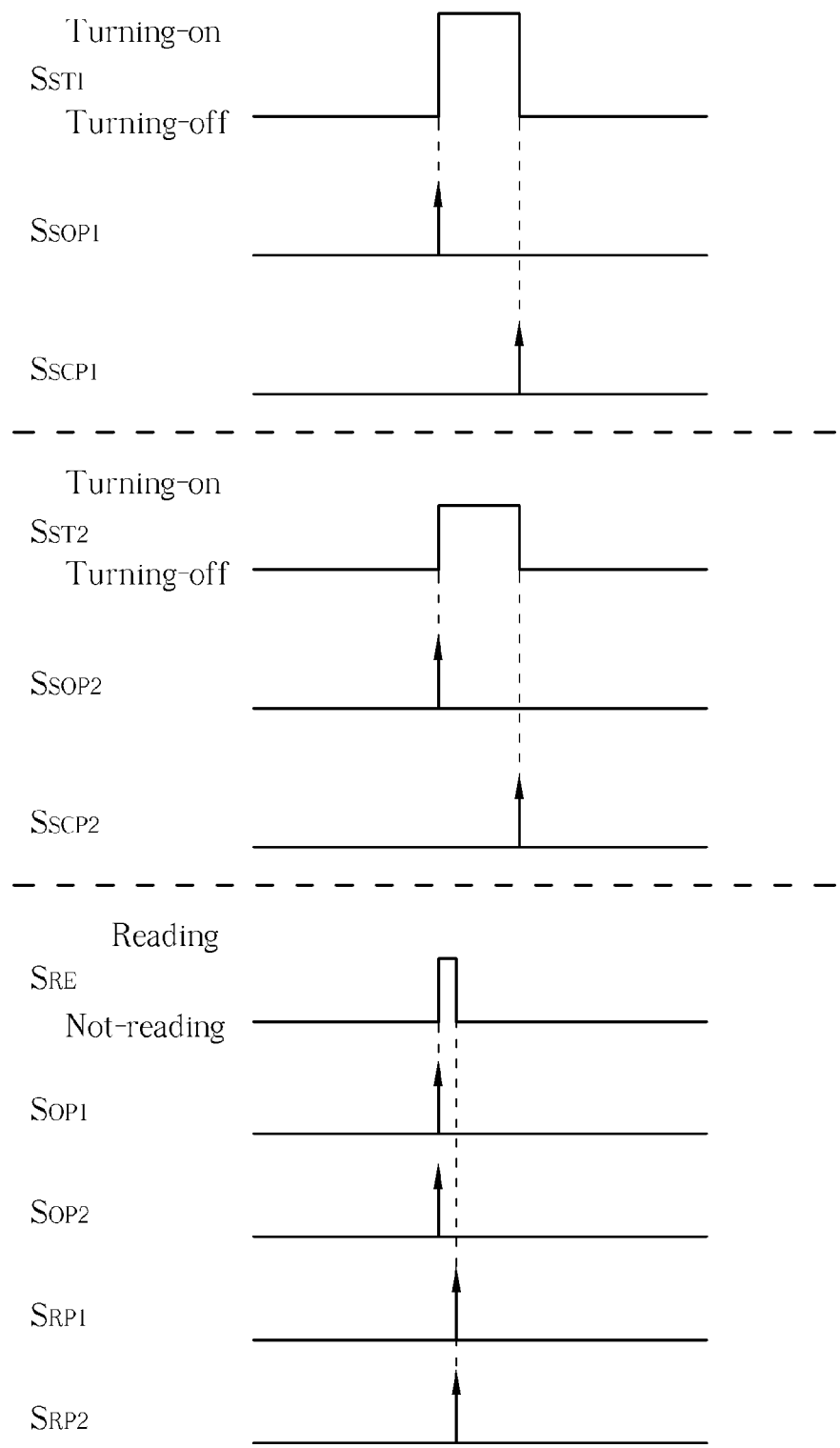
FIG. 6 is a diagram illustrating the driving circuit generating the control signals, according to the shutter periodic signals and the reading signal.

Please refer to FIG. 6. FIG. 6 is a diagram illustrating the driving circuit 512 generating the shutter-on pulse signals $S_{SOP1}$ and $S_{SOP2}$, the shutter-off pulse signals $S_{SCP1}$ and $S_{SCP2}$, the reset pulse signals $S_{RP1}$ and $S_{RP2}$ and the output pulse signals $S_{SCP1}$ and $S_{SP2}$ according the shutter periodic signals $S_{ST1}$ and $S_{ST2}$, and the reading signal $S_{RE}$. As shown in FIG. 6, when the shutter periodic signal $S_{ST1}$ changes from "turning-off" to "turning-on", the driving circuit 512 generates the shutter-on pulse signal $S_{SOP1}$; when the shutter periodic signal $S_{ST1}$ changes from "turning-on" to "turning-off", the driving circuit 512 generates the shutter-off pulse signal $S_{SCP1}$. When the shutter periodic signal $S_{ST2}$ changes from "turning-off" to "turning-on", the driving circuit 512 generates the shutter-on pulse signal $S_{SOP2}$; when the shutter periodic signal $S_{ST2}$ changes from "turning-on" to "turning-off", the driving circuit 512 generates the shutter-off pulse signal $S_{SCP2}$. When the reading signal $S_{RE}$ represents "reading", the driving circuit 512 generates the output pulse signals $S_{OP1}$ and $S_{OP2}$, and then generates the reset pulse signals $S_{RP1}$ and $S_{RP2}$.

Figure 7:
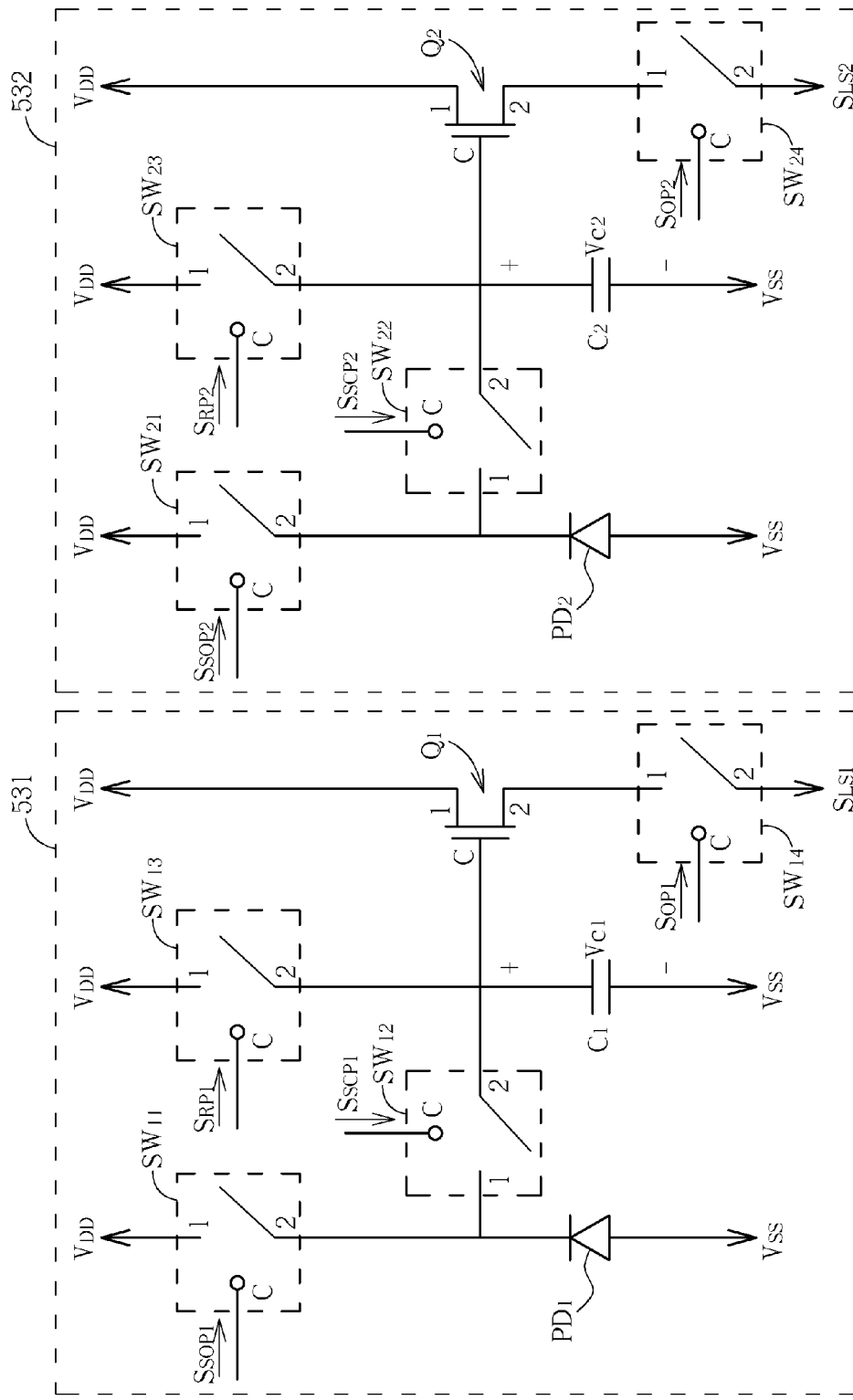
FIG. 7 is a diagram illustrating the structure of the light-sensing group according to an embodiment of the present invention.

Please refer to FIG. 7. FIG. 7 is a diagram illustrating the structure of the light-sensing group 530 according to an embodiment of the present invention. The structure of the light-sensing group 530 is similar to that of the CMOS light sensor of the digital camera. The light-sensing component 531 comprises switches $SW_{11}$, $SW_{12}$, $SW_{13}$ and $SW_{14}$, a photo diode $PD_1$, a capacitor $C_1$, and a transistor $Q_1$. When the control end C of the switch $SW_{13}$ receives the reset pulse signal $S_{RP1}$, the first end 1 of the switch $SW_{13}$ is couple to the second end 2 of the switch $SW_{13}$ (which means the switch $SW_{13}$ is turned on), so that the capacitor $C_1$ is couple to the voltage source $V_{DD}$ through the turned-on switch $SW_{13}$ to reset the voltage $V_{C1}$ to be at a predetermined voltage level (for instance, $V_{DD}$). The photo diode $PD_1$ is utilized for generating and accumulating electrons of a quantity $N_{E1}$ according to the energy of the reflected light $L_{RD}$. When the control end C of the switch $SW_{12}$ receives the shutter-off pulse signal $S_{SCP1}$, the first end 1 of the switch $SW_{12}$ is couple to the second end 2 of the switch $SW_{12}$ (which means the switch $SW_{12}$ is turned on), so that the accumulated electrons of the photo diode $PD_1$ flows to the capacitor $C_1$, reducing the voltage $V_{C1}$. The switch $SW_{11}$ is utilized for eliminating the residual electrons of the photo diode $PD_1$ according to the shutter-on pulse signal $S_{SOP1}$ so as to reset the electron quantity $N_{E1}$. More particularly, when the control end C of the switch $SW_{11}$ receives the shutter-on pulse signal $S_{SOP1}$ the first end 1 of the switch $SW_{11}$ is coupled to the second end 2 of the switch $SW_{11}$, so that the photo diode $PD_1$ is coupled to the voltage source $V_{DD}$ through the turned-on switch $SW_{11}$ and the accumulated electrons of the photo diode $PD_1$ flow to the voltage source $V_{DD}$ through the turned-on switch $SW_{11}$.

The transistor $Q_1$ is utilized as a voltage follower. As a result, the voltage on the second end 2 of the transistor $Q_1$ varies with the voltage ($V_{C1}$) on the control end (gate) C of the transistor $Q_1$. When the control end C of the switch $SW_{14}$ receives the output pulse signal $S_{OP1}$ the first end 1 and the second 2 of the switch $SW_{14}$ are coupled together. Therefore, the switch $SW_{14}$ outputs the light-sensing signal $S_{LS1}$ according to the voltage $V_{C1}$ by means of the transistor $Q_1$ (voltage follower). In this way, the voltage $V_{C1}$ can be obtained according to the light-sensing signal $S_{LS1}$, and the accumulated energy of the light-sensing component 531 can be calculated according to the voltage difference between voltage level of the voltage $V_{C1}$ and the predetermined voltage level (for example, $V_{DD}$).

The light-sensing component 532 comprises switches $SW_{21}$, $SW_{22}$, $SW_{23}$ and $SW_{24}$, a photo diode $PD_2$, a capacitor $C_2$, and a transistor $Q_2$. The structure and the operation principle of the light-sensing component 532 are similar to those of the light-sensing component 531, and are omitted for brevity.

When the light-emitting/sensing controlling circuit 511 generates the shutter periodic signals $S_{ST1}$ or $S_{ST2}$, or the reading signal $S_{RE}$, the driving circuit 512 accordingly generates the corresponding control signals (the shutter-on pulse signals $S_{SOP1}$ and $S_{SOP2}$, shutter-off pulse signals $S_{SCP1}$ and $S_{SCP2}$, reset pulse signals $S_{RP1}$ and $S_{RP2}$, and output pulse signals $S_{OP1}$ and $S_{OP2}$) to control the light-sensing components 531 and 532 of the light-sensing group 530. More particularly, when the shutter periodic signal $S_{ST1}$ represents "turning-on", the light-sensing component 531 senses the energy of the reflected light $L_{RD}$; when the shutter periodic signal $S_{ST2}$ represents "turning-on", the light-sensing component 532 senses the energy of the reflected light $L_{RD}$. When the reading signal $S_{RE}$ represents "reading", the light-sensing component 531 outputs the light-sensing signal $S_{LS1}$ and resets the accumulated energy of the light-sensing component 531 at the same time, and the light-sensing component 532 outputs the light-sensing signal $S_{LS2}$ and resets the accumulated energy of the light-sensing component 532 at the same time. In other words, by means of the driving circuit 512, the light-sensing group 530 can operate as the light-sensing group 130 and the distance-measuring device 500 can operate as the distance-measuring device 100 as well. Consequently, the distance-measuring 500 can correctly measure the measured distance D by means of the methods of the "background-measuring phase", the "frequency-adjusting phase", and the "distance-calculating phase" mentioned in FIG. 2~FIG. 4.

Figure 8:
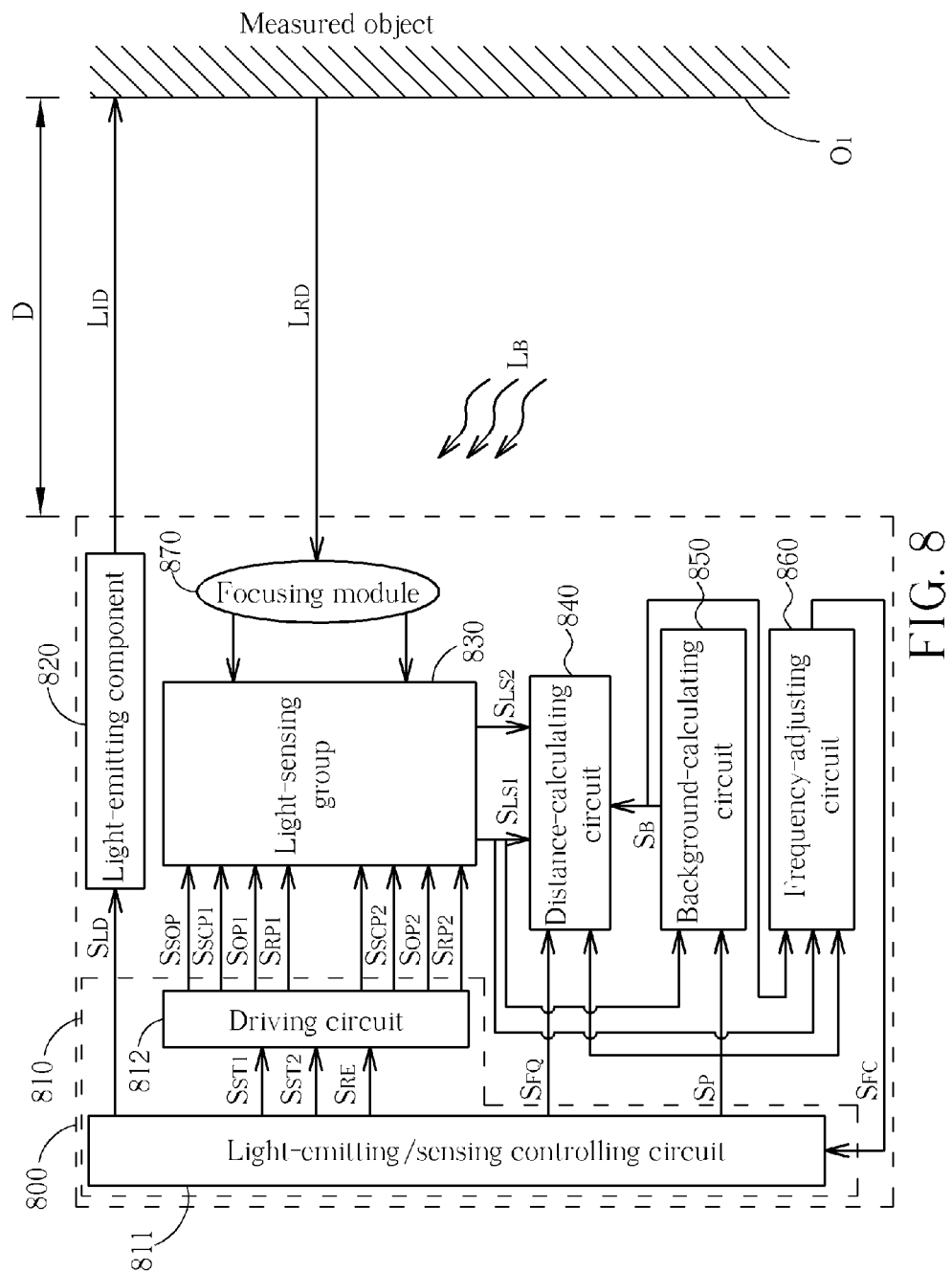
FIG. 8 is a diagram illustrating a distance-measuring device according to a third embodiment of the present invention.

Please refer to FIG. 8. FIG. 8 is a diagram illustrating a distance-measuring device 800 according to a third embodiment of the present invention. The structure and the operation principle of the light-emitting/sensing controlling circuit 811, the light-emitting component 820, the distance-calculating circuit 840, the background-calculating circuit 850, the frequency-adjusting circuit 860, and the focusing module 870 are respectively similar to those of the light-emitting/sensing controlling circuit 110, the light-emitting component 120, the distance-calculating circuit 140, the background-calculating circuit 150, the frequency-adjusting circuit 160, and the focusing module 170, and will not be repeated again for brevity. The light-emitting/sensing module 810 comprises the light-emitting/sensing controlling circuit 811, and a driving circuit 812. The driving circuit 812 generates the shutter-on pulse signal $S_{SOP}$, the shutter-off pulse signals $S_{SCP1}$ and $S_{SCP2}$, the reset pulse signals $S_{RP1}$ and $S_{RP2}$, and the output pulse signals $S_{OP1}$ and $S_{OP2}$ according to the shutter periodic signals $S_{ST1}$ and $S_{ST2}$, and the reading signal $S_{RE}$. The operation principle of the driving circuit 812 is similar to that of the driving circuit 512. The difference between the driving circuits 512 and 812 is that no matter when the shutter periodic signal $S_{ST1}$ or the shutter periodic signal $S_{ST2}$ changes from "turning-off" to "turning-on", the driving circuit 812 triggers the shutter-on pulse signal $S_{SOP}$.

Figure 9:
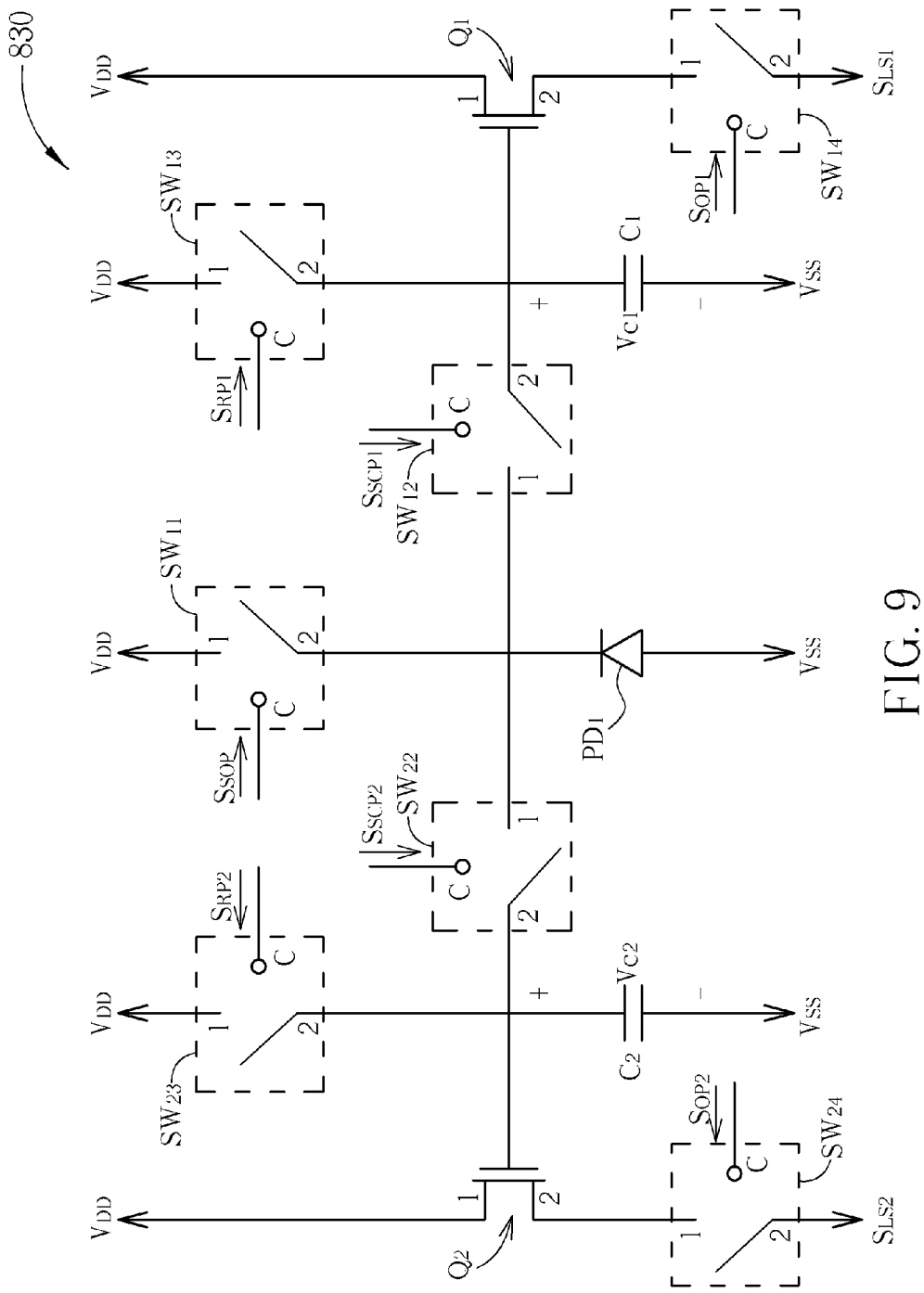
FIG. 9 is a diagram illustrating the structure of the light-sensing group according to an embodiment of the present invention.

Please refer to FIG. 9. FIG. 9 is a diagram illustrating the structure of the light-sensing group 830 according to an embodiment of the present invention. The structure and the operation principle of the light-sensing group 830 are similar to those of the light-sensing group 530. Compared with the light-sensing group 530, the light-sensing group 830 does not have the switch $SW_{21}$ and the photo diode $PD_2$. Since in the "background-measuring phase" or in the "frequency-adjusting phase", the distance-measuring device 500 uses only the light-sensing component 531 of the light-sensing group 530, it means that in the "background-measuring phase" or in the "frequency-adjusting phase", the distance-measuring device 500 does not need the switch $SW_{21}$ and the photo diode $PD_2$. Therefore, n the "background-measuring phase" or in the "frequency-adjusting phase", the distance-measuring device 800 can operate as the distance-measuring device 500 by means of the light-sensing group 830. In addition, since in the detecting cycles $T_{C1}$~$T_{CN}$ of the "distance-calculating phase", when the shutter periodic signal $S_{ST1}$ represents "turning-on", the shutter periodic signal $S_{ST2}$ represents "turning-off"; when the shutter periodic signal $S_{ST1}$ represents "turning-off", the shutter periodic signal $S_{ST2}$ represents "turning-on". That is, the shutter periodic signals $S_{ST1}$ and $S_{ST2}$ do not represent "turning-on" at the same time. Thus, in the first-half cycles of the detecting cycles $T_{C1}$~$T_{CN}$ (the shutter periodic signal $S_{ST1}$ represents "turning-on"), the distance-measuring device 800 can use the photo diode $PD_1$ of the light-sensing group 830 to accumulate electrons. When the shutter periodic signal $S_{ST1}$ changes from "turning-on" to "turning-off", the accumulated electrons of the photo diode $PD_1$ flows to the capacitor $C_1$ so as to change the voltage level of the voltage $V_{C1}$. In the second-half cycles of the detecting cycles $T_{C1}$~$T_{CN}$ (the shutter periodic signal $S_{ST2}$ represents "turning-on"), the distance-measuring device 800 can use the photo diode $PD_1$ of the light-sensing group 830 to accumulate electrons as well. When the shutter periodic signal $S_{ST2}$ changes from "turning-on" to "turning-off", the accumulated electrons of the photo diode $PD_1$ flows to the capacitor $C_2$ so as to change the voltage level of the voltage $V_{C2}$. That is, although the light-sensing group 830 has only one photo diode $PD_1$, the light-sensing group 830 still can operate as the light-sensing group 530 in the "distance-calculating phase". In other words, the distance-measuring device 800 can operate as the distance-measuring device 500 in the "distance-calculating phase". In this way, since the distance-measuring device 800 can operate as the distance-measuring device 500 in the "background-measuring phase", the "frequency-adjusting phase", and the "distance-calculating phase", the distance-measuring device 800 also can correctly measure the measured distance D by means of the methods of the "background-measuring phase", the "frequency-adjusting phase", and the "distance-calculating phase" mentioned in FIG. 2~FIG. 4.

In addition, in the light-sensing group 530, the area occupied by the photo diode $PD_2$ is large. Hence, compared with the light-sensing group 530, the area occupied by the light-sensing group 830 is smaller, so that the cost of the light-sensing group 830 is lower.

Figure 10:
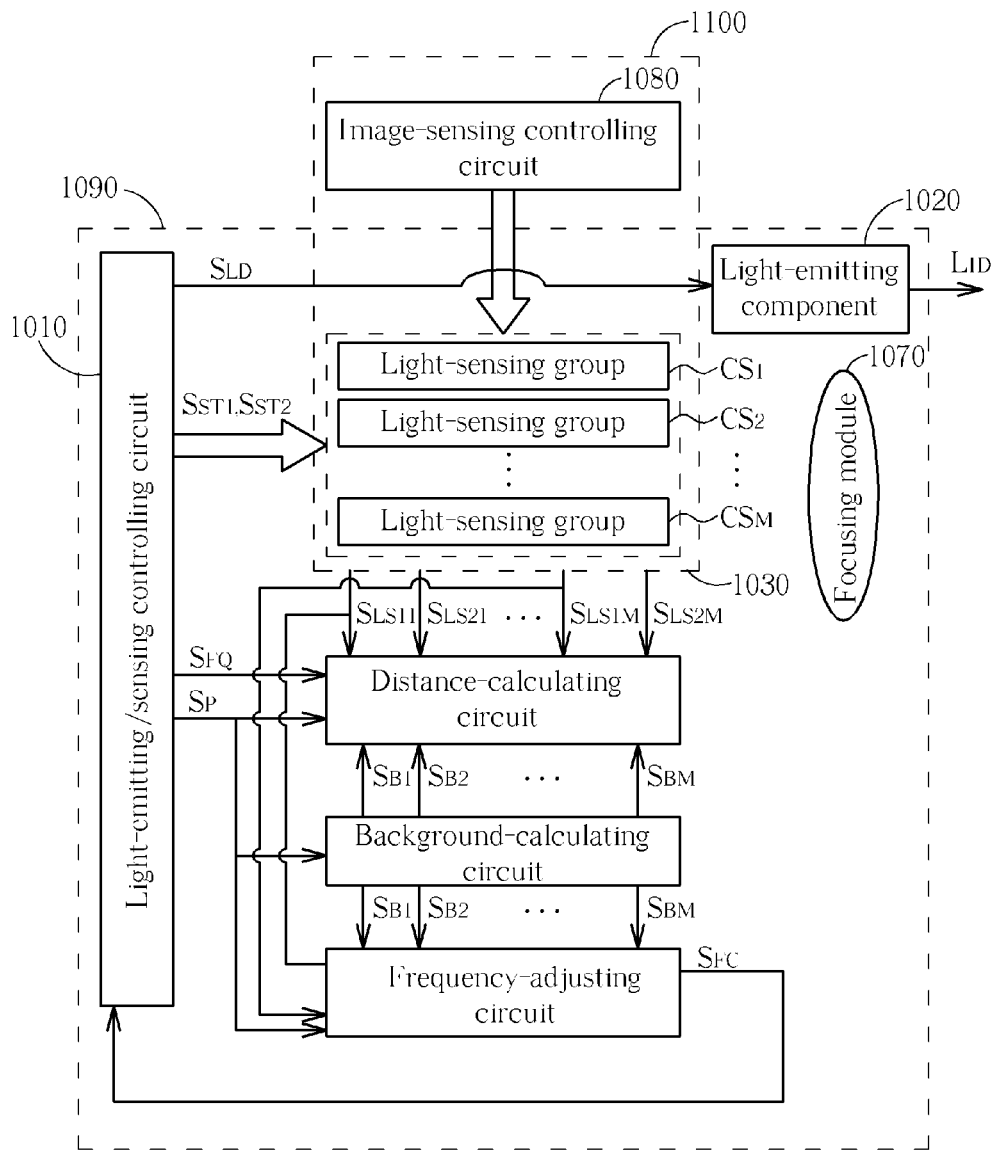
FIG. 10 and FIG. 11 are diagrams illustrating a 3D image-sensing device of the present invention.
Figure 11:
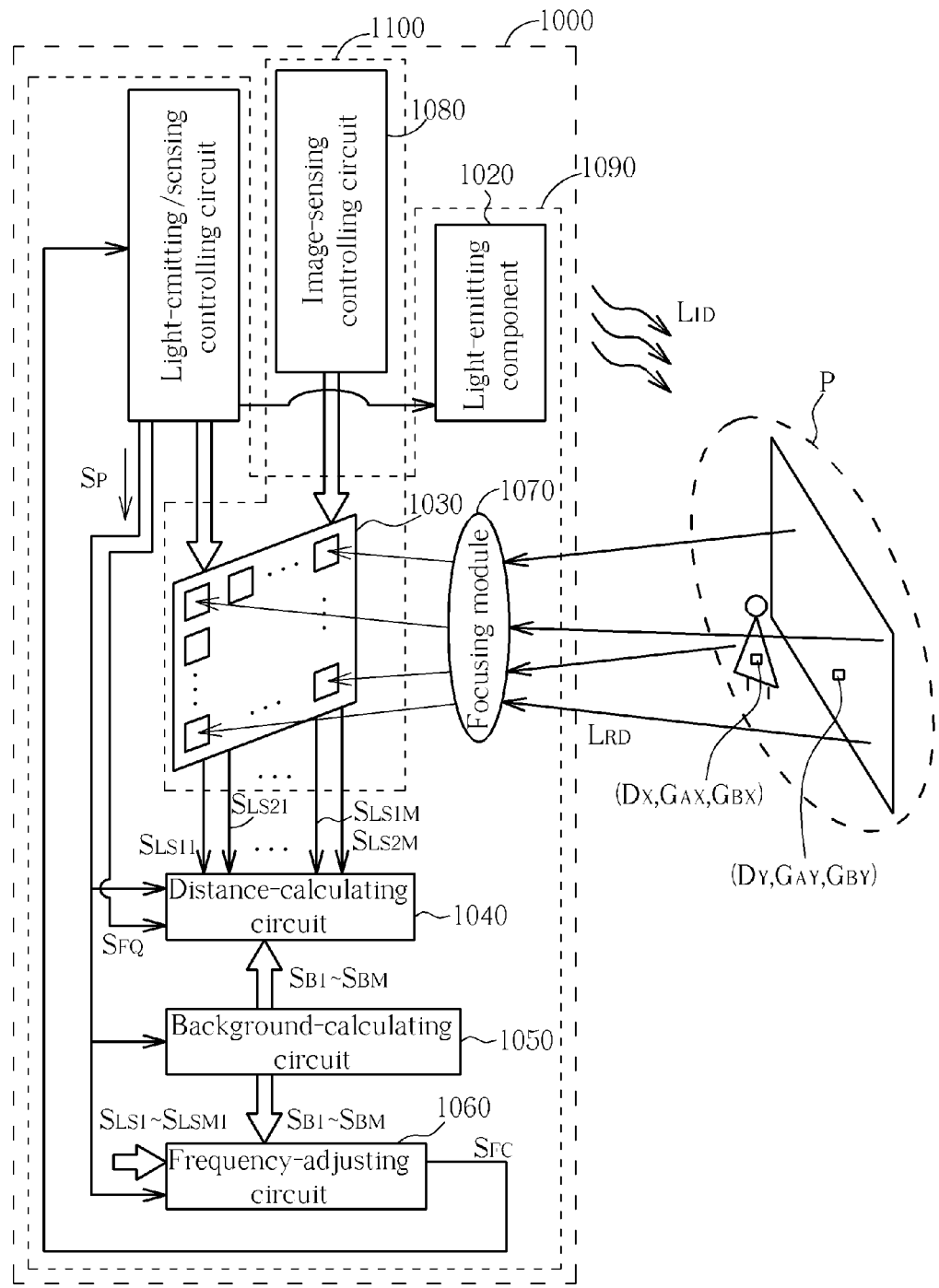

Please refer to FIG. 10 and FIG. 11. FIG. 10 and FIG. 11 are diagrams illustrating a 3D image-sensing device 1000 of the present invention. The 3D image-sensing device 1000 comprises a distance-measuring device 1090 and a 2D image-sensing device 1100. The distance-measuring device 1090 comprises a light-emitting/sensing controlling circuit 1010, a light-emitting component 1020, a light-sensing module 1030, a distance-calculating circuit 1040, a background-calculating circuit 1050, a frequency-adjusting circuit 1060, and a focusing module 1070. The 2D image-sensing device 1100 comprises an image-sensing controlling circuit 1080, and the light-sensing module 1030, wherein the light-sensing module 1030 is shared by the 2D image-sensing device 1100 and the distance-measuring device 1090. The operation principle and the structure of the light-emitting/sensing controlling circuit 1010, the light-emitting component 1020, the distance-calculating circuit 1040, the background-calculating circuit 1050, the frequency-adjusting circuit 1060 are respectively similar to those of the light-emitting/sensing controlling circuit 110 (or the light-emitting/sensing controlling circuit 511), the light-emitting component 120 (or the light-emitting component 520 or 820), the distance-calculating circuit 140 (or the distance-calculating circuit 540 or 840), the background-calculating circuit 150 (or the background-calculating circuit 550 or 850), the frequency-adjusting circuit 160 (or the frequency-adjusting circuit 560 or 860). Compared with the distance-measuring devices 130, 500, and 800, the light-sensing module 1030 of the 3D image-sensing device 1000 comprises light-sensing groups $CS_1$~$CS_M$, wherein M represents a positive integer. The operation principle and the structure of the light-sensing groups $CS_1$~$CS_M$ are similar to those of the light-sensing group 130 or 530. In addition, the light-sensing groups $CS_1$~$CS_M$ are controlled by the image-sensing controlling circuit 1080 for sensing a scene P (as shown in FIG. 11) so as to obtain a 2D image SIM. The scene P comprises reflecting points $PN_1$~$PN_M$. The 2D image SIM comprises M pixels, and each pixel comprises two sub-pixels. The reflecting points $PN_1$~$PN_M$ of the scene P are respectively correspond to the M pixels of the 2D image SIM.

The 3D image-sensing device 1000 can use the image-sensing controlling circuit 1080 to control the light-sensing module 1030 sensing each reflecting point of the scene P so as to obtain the sub-pixel image data of the M pixels corresponding to reflecting points $PN_1$~$PN_M$. In addition, the 3D image-sensing device 1000 also can use the distance-measuring module 1090 to measure the distance between each reflecting point of the scene P and the 3D image-sensing device 1000. In other words, the 3D image-sensing device 1000 can obtain the 2D image SIM corresponding to the reflecting points $PN_1$~$PN_M$ and the distance data corresponding to the measured distances $D_1$~$D_M$ between the reflecting points $PN_1$~$PN_M$ and the 3D image-sensing device 1000.

For example, the structures of the light-sensing groups $CS_1$~$CS_M$ are similar to that of the light-sensing group 530. That is, each of the light-sensing groups $CS_1$~$CS_M$ comprises two light-sensing components. The light-sensing group $CS_1$ comprises light-sensing components $CSA_1$ and $CSB_1$; the light-sensing group $CS_2$ comprises light-sensing components $CSA_2$ and $CSB_2$; and the light-sensing group $CS_M$ comprises light-sensing components $CSA_M$ and $CSB_M$ and so on. As a result, the 3D image-sensing device 1000 generates the shutter periodic signals $S_{ST1}$ and $S_{ST2}$, and the reading signal $S_{RE}$ by means of the light-emitting/sensing controlling circuit 1010 of the distance-measuring device 1090 to control the light-sensing groups $CS_1$~$CS_M$. For example, the light-sensing group $CS_K$ comprises light-sensing components $CSA_K$ and $CSB_K$. When the shutter periodic signal $S_{ST1}$ represents "turning-on", the light-sensing component $CSA_K$ senses the energy of the reflected light $L_{RD}$, which is generated by the reflecting point $PN_K$ of the scene P reflecting the detecting light $L_{ID}$, so as to accordingly accumulate the energy $E_{R1K}$;

when the shutter periodic signal $S_{ST1}$ represents "turning-off", the light-sensing component $CSA_K$ does not sense the energy of the reflected light $L_{RD}$ generated by the reflecting point $PN_K$ of the scene P reflecting the detecting light $L_{ID}$, and does not accumulate the energy $E_{R1K}$. When the reading signal $S_{RE}$ represents "reading", the light-sensing component $CSA_K$ outputs the light-sensing signal $S_{LS1K}$ according to the accumulated energy $E_{R1K}$. When the shutter periodic signal $S_{ST2}$ represents "turning-on", the light-sensing component $CSB_K$ senses the energy of the reflected light $L_{RD}$ generated by the reflecting point $PN_K$ of the scene P reflecting the detecting light $L_{ID}$, so as to accordingly accumulate the energy $E_{R2K}$; when the shutter periodic signal $S_{ST2}$ represents "turning-off", the light-sensing component $CSB_K$ does not sense the energy of the reflected light $L_{RD}$ generated by the reflecting point $PN_K$ of the scene P reflecting the detecting light $L_{ID}$, and does not accumulate the energy $E_{R2K}$. When the reading signal $S_{RE}$ represents "reading", the light-sensing component $CSB_K$ outputs the light-sensing signal $S_{LS2K}$ according to the accumulated energy $E_{R2K}$. In addition, when the reading signal $S_{RE}$ represents "reading", the light-sensing components $CSA_K$ and $CSB_K$ reset the accumulated energy $E_{R1K}$ and $E_{R2K}$ after the light-sensing components $CSA_K$ and $CSB_K$ output the light-sensing signals $S_{LS1K}$ and $S_{LS2K}$.

In this way, the light-emitting/sensing controlling circuit 1010 respectively controls the light-sensing groups $CS_1$~$CS_M$ measuring the measured distances $D_1$~$D_M$ between the reflecting points $PN_1$~$PN_M$ of the scene P and the 3D image-sensing device 1000, by means of the methods of the "background-measuring phase" mentioned in FIG. 2, the "frequency-adjusting phase" mentioned in FIG. 4, and the "distance-calculating phase" mentioned in FIG. 3.

On the other hand, the 3D-image sensing device 1000 uses the image-sensing controlling circuit 1080 to control the light-sensing module 1030 sensing the reflecting points $PN_1$~$PN_M$ of the scene P to obtain the 2D image SIM, wherein the 2D image SIM comprises the sub-pixel image data $G_{A1}$~$G_{AM}$ and $G_{B1}$~$G_{BM}$. More particularly, the image-sensing controlling circuit 1080 respectively controls the light-sensing components $CSA_1$ and $CSB_1$ sensing the reflecting point $PN_1$ of the scene P so as to obtain the two sub-pixel image data $G_{A1}$ and $G_{B1}$; the image-sensing controlling circuit 1080 respectively controls the light-sensing components $CSA_X$ and $CSB_X$ sensing the reflecting point $PN_X$ of the scene P so as to obtain the two sub-pixel image data $G_{AX}$ and $G_{BX}$, wherein the distance between the reflecting point $PN_X$ and the 3D image-sensing device 1000 is $D_X$; the image-sensing controlling circuit 1080 respectively controls the light-sensing components CSA and CSB sensing the reflecting point $PN_Y$ of the scene P so as to obtain the two sub-pixel image data $G_{AY}$ and $G_{BY}$, wherein the distance between the reflecting point $PN_Y$ and the 3D image-sensing device 1000 is $D_y$; the image-sensing controlling circuit 1080 respectively controls the light-sensing components $CSA_M$ and $CSB_M$ sensing the reflecting point $PN_M$ of the scene P so as to obtain the two sub-pixel image data $G_{AM}$ and $G_{BM}$ and so on. In this way, the 3D image-sensing device 100 can construct a 3D image by means of the sub-pixel image data $G_{A1}$~$G_{AM}$ and $G_{B1}$~$G_{BM}$, and the distance data $D_1$~$D_M$.

In addition, the light-sensing groups $CS_1$~$CS_M$ of the light-sensing module 1030 are CMOS or CCD light sensors. That is, the structure and the principle of the light-sensing module 1030 are similar to those of the image-sensing module of the digital camera. In other words, when the 3D image-sensing device is applied in the digital camera, the digital camera can control the light-sensing module 1030 sensing the scene so as to obtain the 2D image by means of the image-sensing controlling circuit 1080 of the 3D image-sensing device 1000, and also can measure each distance between each reflecting point of the scene and the digital camera so as to obtain each distance data corresponding to each pixel by means of the distance-measuring device 1090 of the 3D image-sensing device 1000. In this way, the digital camera can construct a 3D image according to the distance data and the 2D image. Since the 2D image-sensing device 1100 and the distance-measuring device 1090 of the 3D image-sensing device 1000 share the light-sensing module 1030, the cost of constructing the 3D image is reduced.

For the distance-measuring device to more correctly calculate the measured distance, the present invention further provides a method of increasing signal-to-noise ratio of the distance-measuring device.

Figure 12:
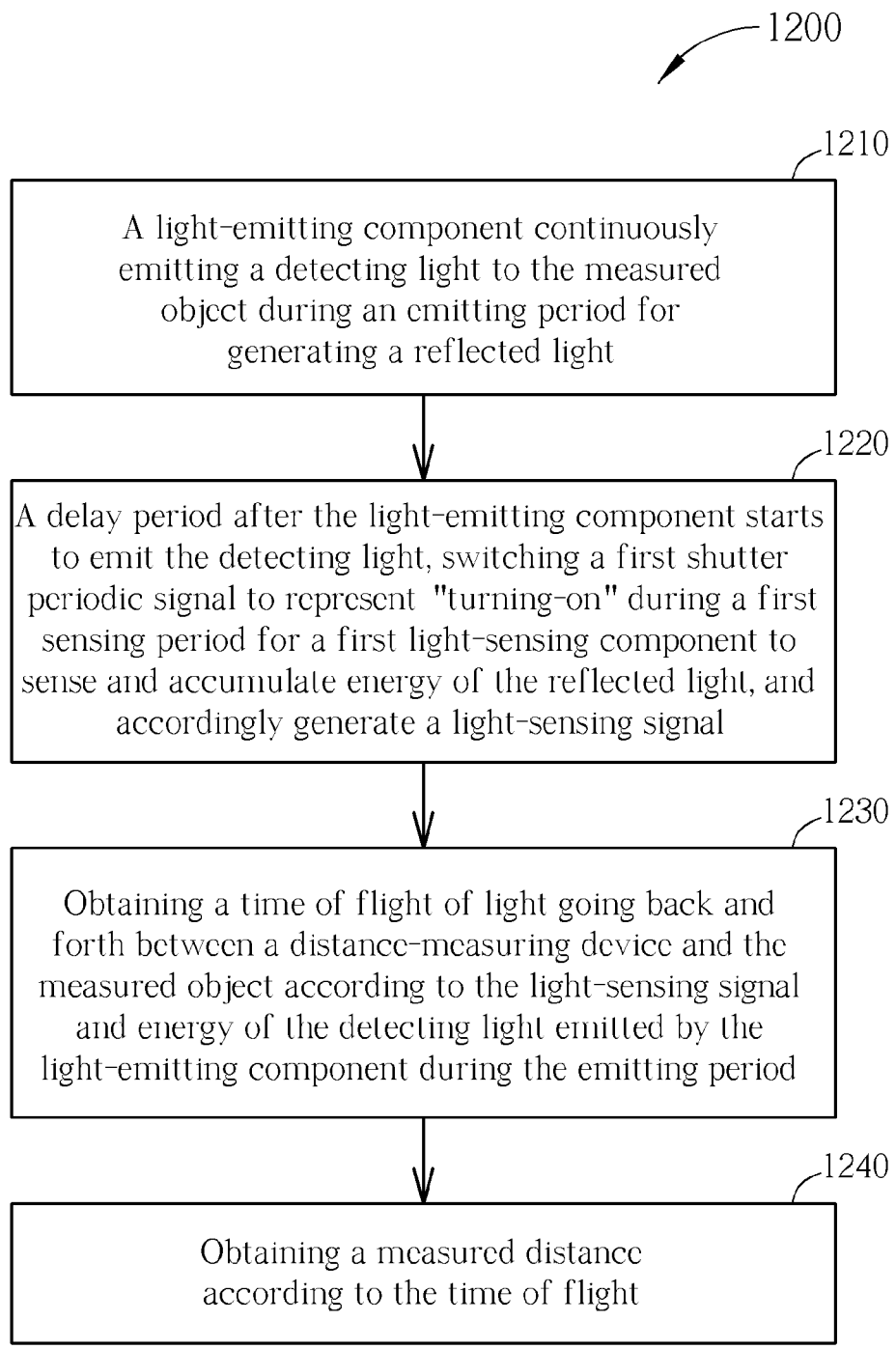
FIG. 12, FIG. 13, FIG. 14, and FIG. 15 are diagrams illustrating a method of increasing signal-to-noise ratio of a distance-measuring device according to an embodiment of the present invention.
Figure 13:
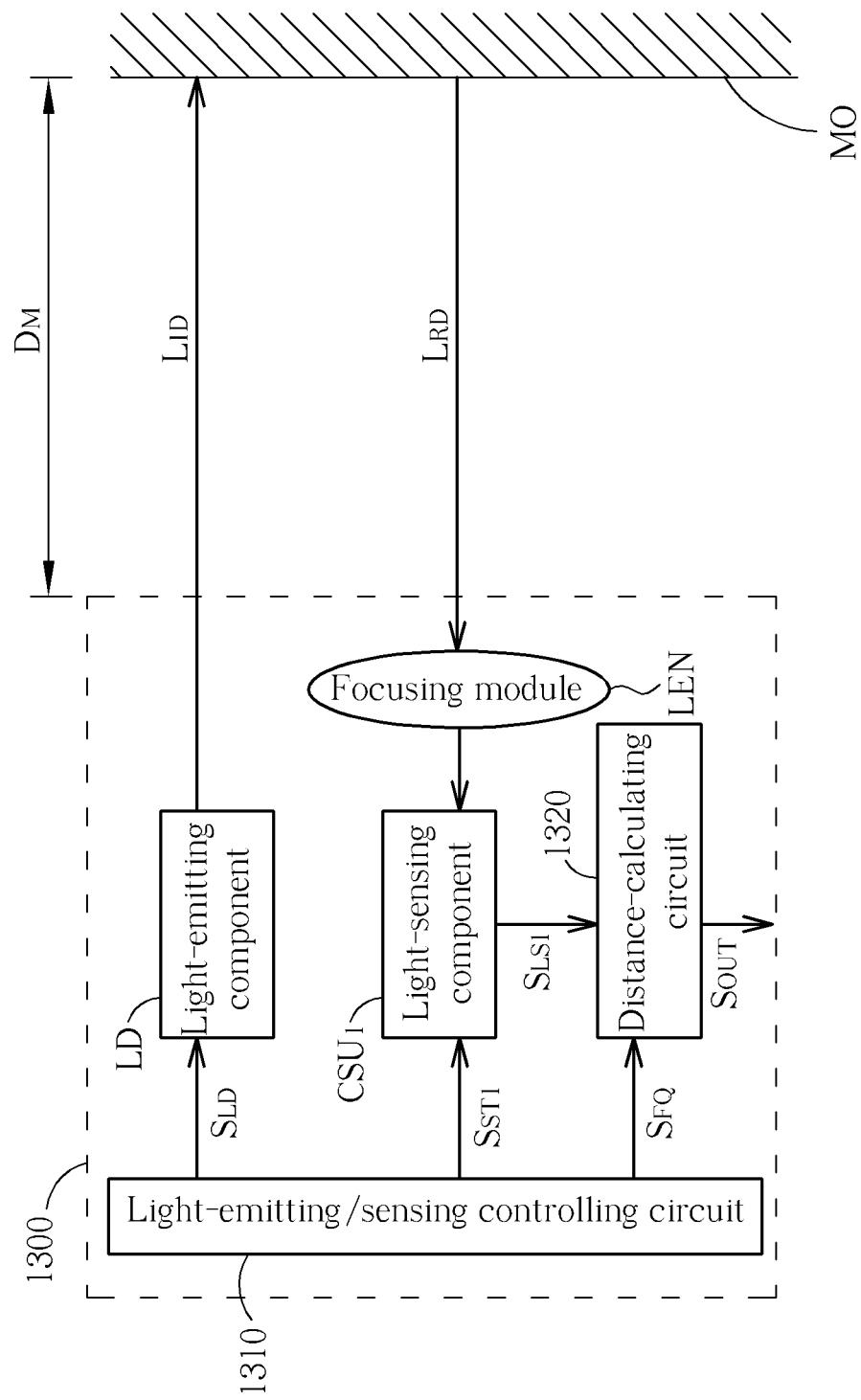

Please refer to FIG. 12. FIG. 12 is a diagram illustrating a method 1200 of increasing signal-to-noise ratio of the distance-measuring device according to an embodiment of the present invention. Please refer to FIG. 13. The method 1200 is applied for a distance-measuring device 1300. The distance-measuring device 1300 is utilized for measuring a measured distance $D_M$ between a measured object MO and the distance-measuring device 1300. The distance-measuring device 1300 includes a light-emitting/sensing controlling circuit 1310, a distance-calculating circuit 1320, a light-emitting component LD, a focusing module LEN, and a light-sensing component $CSU_1$. The structures and the operational principles of the light-emitting component LD and the focusing module LEN are similar to those of the light-emitting components 120, 520, 820, and 1020, and the focusing modules 170, 570, and 870, respectively. The light-sensing component $CSU_1$ can be realized by the light-sensing component 531 (or 532). The light-sensing component $CSU_1$ senses and accumulates energy of light according to a shutter periodic signal $S_{ST1}$, so as to generate a light-sensing signal $S_{LS1}$. The steps of the method 1200 are illustrated as below:

step 1210: by means of the light-emitting periodic signal $S_{LD}$, the light-emitting/sensing controlling circuit 1310 controls the light-emitting component LD to continuously emit a detecting light $L_{ID}$ to the measured object MO during an emitting period $T_{LD}$ for generating a reflected light $L_{RD}$;

step 1220: a delay period $T_{DELAY}$ after the light-emitting component LD starts to emit the detecting light $L_{ID}$, the light-emitting sensing controlling circuit 1310 switches the shutter periodic signal $S_{ST1}$ to represent "turning-on" during a sensing period $T_{SEN1}$ for the light-sensing component $CSU_1$ to sense and accumulate energy of the reflected light $L_{RD}$, and accordingly generate the light-sensing signal $S_{LS1}$;

step 1230: the distance-calculating circuit 1320 obtains a time of flight $T_{TOF}$ of light going back and forth between the distance-measuring device 1300 and the measured object MO according to the light-sensing signal $S_{LS1}$ and energy of the detecting light $L_{ID}$ emitted by the light-emitting component LD during the emitting period $T_{LD}$;

step 1240: the distance-calculating circuit 1320 obtains the measured distance $D_M$ according to the time of flight $T_{TOF}$, and accordingly generates an output signal $S_{OUT}$ for representing length of the measured distance $D_M$.

Figure 14:
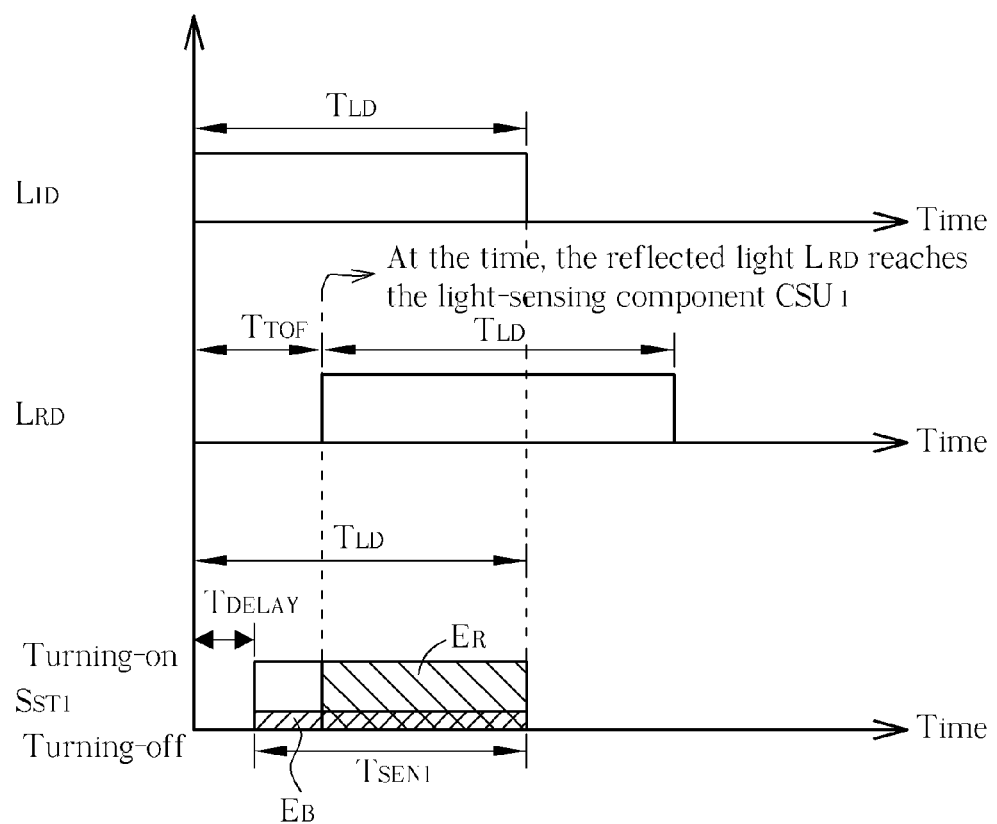

Please refer to FIG. 14. In the step 1210, by means of the light-emitting periodic signal $S_{LD}$, the light-emitting/sensing controlling circuit 1310 controls the light-emitting component LD to continuously emit a detecting light $L_{ID}$ to the measured object MO during an emitting period $T_{LD}$ for generating a reflected light $L_{RD}$. A time of flight $T_{TOF}$ after the light-emitting component LD starts to emit the detecting light $L_{ID}$, the reflected light $L_{RD}$ reaches the light-sensing component $CSU_1$. The period length of the time of flight $T_{TOF}$ is the sum of period lengths of the period of the detecting light $L_{ID}$ emitted from the light-emitting component LD to the measured object MO and the period of the reflected light $L_{RD}$ emitted from the measured object MO to the light-sensing component $CSU_1$. In other words, the period length of the time of flight $T_{TOF}$ is equal to that of the period of light going back and forth between the distance-measuring device 1300 and the measured object MO.

In the step 1220, a delay period $T_{DELAY}$ after the light-emitting component LD starts to emit the detecting light $L_{ID}$, the light-emitting sensing controlling circuit 1310 switches the shutter periodic signal $S_{ST1}$ to represent "turning-on" for a sensing period $T_{SEN1}$. Thus, the light-sensing component $CSU_1$ senses and accumulates energy of light and accordingly generates the light-sensing signal $S_{LS1}$. In addition, generally speaking, the range of length of the measured distance $D_M$ is limited according to the application of the distance-measuring device 1300. In the present invention, the length of the measured distance $D_M$ that the distance-measuring device 1300 can measure is limited to between a predetermined shortest measured distance $D_{MIN}$ and a predetermined longest measured distance $D_{MAX}$. For example, the distance-measuring device 1300 may be applied in a video game console. The distance-measuring device 1300 is disposed near a display device. The video game console detects the measured distance $D_M$ between the user and the display device by means of the distance-measuring device 1300, and interacts with the user according to the measured distance $D_M$. For example, the user plays a tennis game. When the measured distance $D_M$ decreases, the player in the game controlled by the user moves forward; when the measured distance $D_M$ increases, the player in the game controlled by the user moves backward. However, when the measured distance $D_M$ between the display device and the user is too short (that is, the measured distance $D_M$ is shorter than the predetermined shortest measured distance $D_{MIN}$), the user cannot see the whole image displayed by the display device and cannot easily play the tennis game. In other words, only when the measured distance $D_M$ is longer than the predetermined shortest measured distance $D_{MIN}$ is the measured distance $D_M$ valid for the video game console to interact with the user. Since the measured distance $D_M$ is longer than the predetermined shortest measured distance $D_M$, in the step 1220, the light-emitting/sensing controlling circuit 1310 calculates the delay period $T_{DELAY}$ according to the predetermined shortest measured distance $D_{MIN}$ for ensuring that the reflected light $L_{RD}$ reaches the light-sensing component $CSU_1$ after the delay period $T_{DELAY}$. The light-emitting/sensing controlling circuit 1310 calculates the delay period $T_{DELAY}$ according to the following formula:

$$T_{DELAY} = 2 \times D_{MIN}/C \quad (6).$$

Since the measured distance $D_M$ is longer than the predetermined shortest measured distance $D_M$, the time of flight $T_{TOF}$ when the distance-measuring device 1300 measures the measured distance $D_M$ is longer than the delay period $T_{DELAY}$ calculated according to the formula (6). In other words, although the light-sensing component $CSU_1$ starts to sense the energy of the light a delay period $T_{DELAY}$ after the light-emitting component LD starts to emit the detecting light $L_{ID}$, the light-sensing component $CSU_1$ can still sense the reflected light $L_{RD}$ in time.

In the step 1230, the light-sensing signal $S_{LS1}$ can represent the energy of the reflected light $L_{RD}$ sensed by the light-sensing component $CSU_1$. In this way, the distance-calculating circuit 1320 can obtain the time of flight $T_{TOF}$ of the light going back and forth between the distance-measuring device 1300 and the measured object MO, according to the ratio between the energy of the reflected light $L_{RD}$ sensed by the light-sensing component $CSU_1$ and the energy of the detecting light $L_{ID}$ emitted by the light-emitting component LD during the emitting period $T_{LD}$.

In the step 1240, since the time of flight $T_{TOF}$ is the period of the light going back and forth between the distance-measuring device 1300 and the measured object MO, the distance-calculating circuit 1320 can calculate the measured distance $D_M$ according to the following formula:

$$D_M = T_{TOF} \times C/2 \qquad (7);$$

wherein C represents speed of light. In this way, the distance-calculating circuit 1320 can generate the output signal $S_{OUT}$ representing the length of the measured distance $D_M$.

In the conventional method, the light-sensing component $CSU_1$ of the distance-measuring device 1300 starts to sense energy of light immediately after the light-emitting component LD starts to emit the detecting light $L_{ID}$. In the step 1220 of the method 1200, the light-emitting sensing controlling circuit 1310 controls the light-sensing component $CSU_1$ to start to sense energy of light a delay period $T_{DELAY}$ after the light-emitting component LD starts to emit the detecting light $L_{ID}$. In this way, the light-emitting component $CSU_1$ does not sense the energy of the background light $L_B$ (noise) during the delay period $T_{DELAY}$. Therefore, the signal-to-noise ratio of the light-sensing signal $S_{LS1}$ generated by the light-sensing component $CSU_1$ is improved. More particularly, provided that the light-sensing component $CSU_1$ stops sensing energy of light when the light-emitting component LD stops emitting detecting light $L_{ID}$ (as shown in FIG. 14), in the conventional method, the energy $E_{B\_OLD}$ of the background light $L_B$ sensed by the light-sensing component $CSU_1$ is proportional to the emitting period $T_{LD}$, and the energy of the reflected light $L_{RD}$ sensed by the light-sensing component $CSU_1$ is $E_{R\_OLD}$. In the method 1200, the energy $E_{B\_NEW}$ of the background light $L_B$ sensed by the light-sensing component $CSU_1$ is proportional to the sensing period $T_{SEN1}$. Since the reflected light $L_{RD}$ reaches the light-sensing component $CSU_1$ after the delay period $T_{DELAY}$, the energy of the reflected light $L_{RD}$ sensed by the light-sensing component $CSU_1$ is still $E_{R\_OLD}$. Hence, the energy $E_{B\_NEW}$ is less than the energy $E_{B\_OLD}$. Compared with the signal-to-noise ratio ($E_{R\_OLD}/E_{B\_OLD}$) of the conventional method, the light-sensing signal $S_{LS1}$ obtained by the method 1200 has a higher signal-to-noise ratio ($E_{R\_OLD}/E_{B\_NEW}$). In other words, the light-sensing signal $S_{LS1}$ obtained by the method 1200 can more correctly represent the energy of the reflected light $L_{RD}$ sensed by the light-sensing component $CSU_1$. As a result, the time of flight $T_{TOF}$ obtained in the step 1230 is more correct. In this way, a more correct measured distance $D_M$ can be calculated in the step 1240.

In addition, in FIG. 14, the reflected light $L_{RD}$ has to reach the light-sensing component $CSU_1$ before the end of the sensing period $T_{SEN1}$ for the distance-measuring device 1300 to be capable of measuring the measured distance $D_M$. That is, the period length of the time of flight $T_{TOF}$ has to be shorter than the sum of period lengths of the sensing period $T_{SEN1}$ and the delay period $T_{DELAY}$. In other words, the predetermined longest measured distance $D_{MAX}$ that the distance-measuring device can measure is represented by the following formula:

$$D_{MAX} = 2 \times (T_{SEN1} + T_{DELAY})/C \qquad (8).$$

Figure 15:
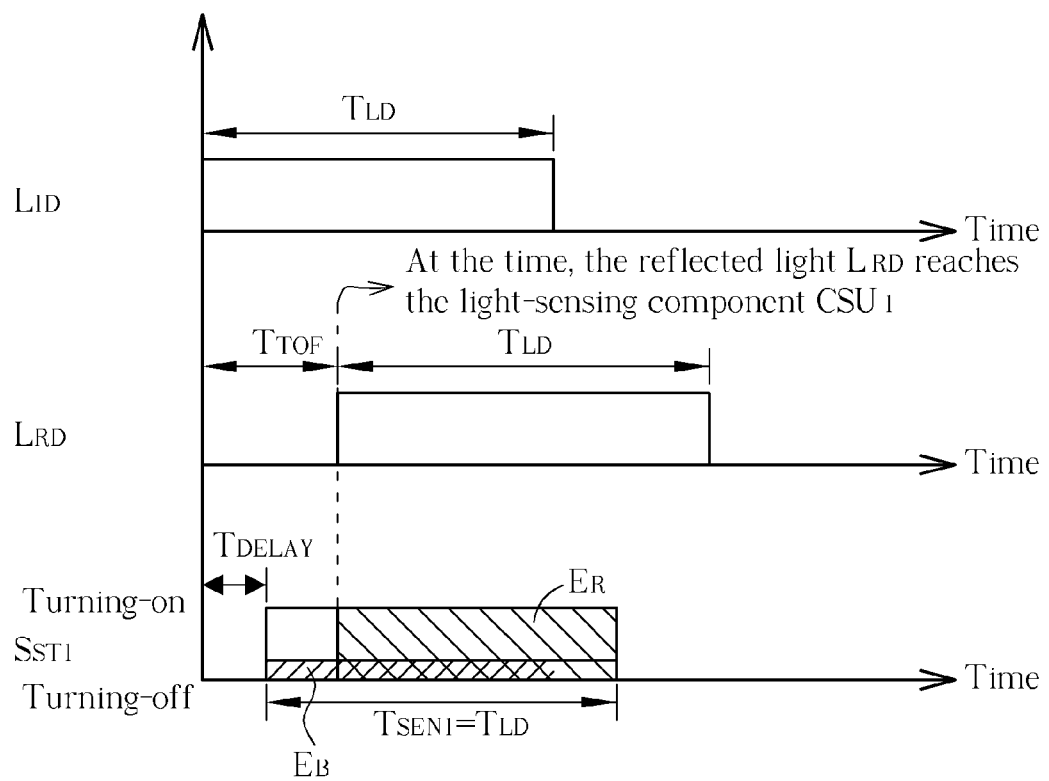

In addition, in FIG. 14, the sum of the period lengths of the sensing period $T_{SEN1}$ and the delay period $T_{DELAY}$ is equal to the period length of the emitting period $T_{LD}$. That is, the light-emitting/sensing controlling circuit 1310 controls the light-sensing components $CSU_1$ to immediately stop sensing the energy of the reflected light $L_{RD}$ when the light-emitting component LD stops emitting the detecting light $L_{ID}$. However, the light-sensing components $CSU_1$ are not limited to immediately stop sensing the energy of the reflected light $L_{RD}$ when the light-emitting component LD stops emitting the detecting light $L_{ID}$. For example, please refer to FIG. 15. The light-emitting/sensing controlling circuit 1310 can set the period length of the sensing period $T_{SEN1}$ equal to that of the emitting period $T_{LD}$. It can be seen from formula (8) that since the sensing period $T_{SEN1}$ increases, the predetermined longest measured distance $D_{MAX}$ increases.

Figure 16:
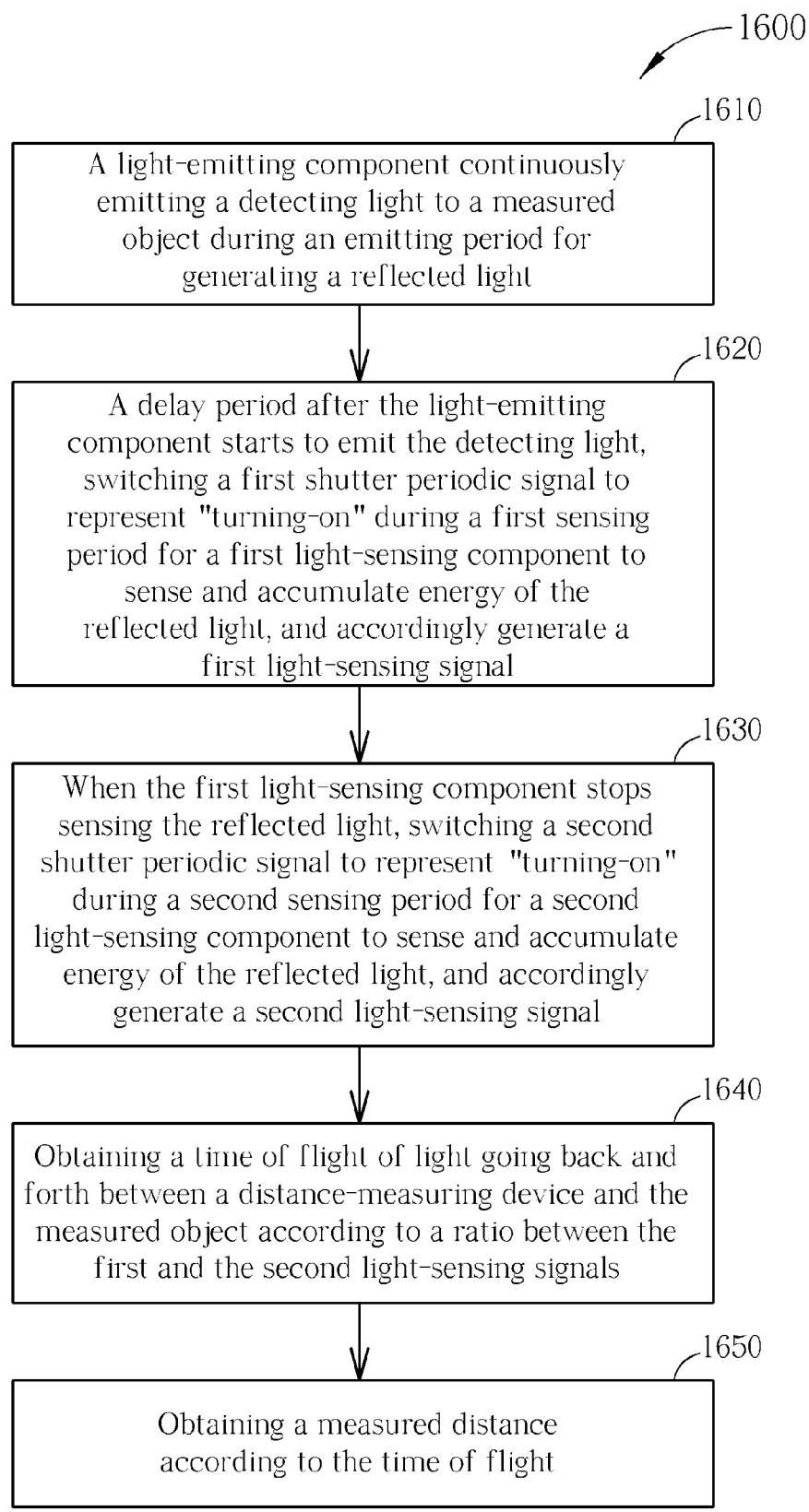
FIG. 16, FIG. 17, FIG. 18, and FIG. 19 are diagrams illustrating a method of increasing signal-to-noise ratio of a distance-measuring device according to another embodiment of the present invention.
Figure 17:
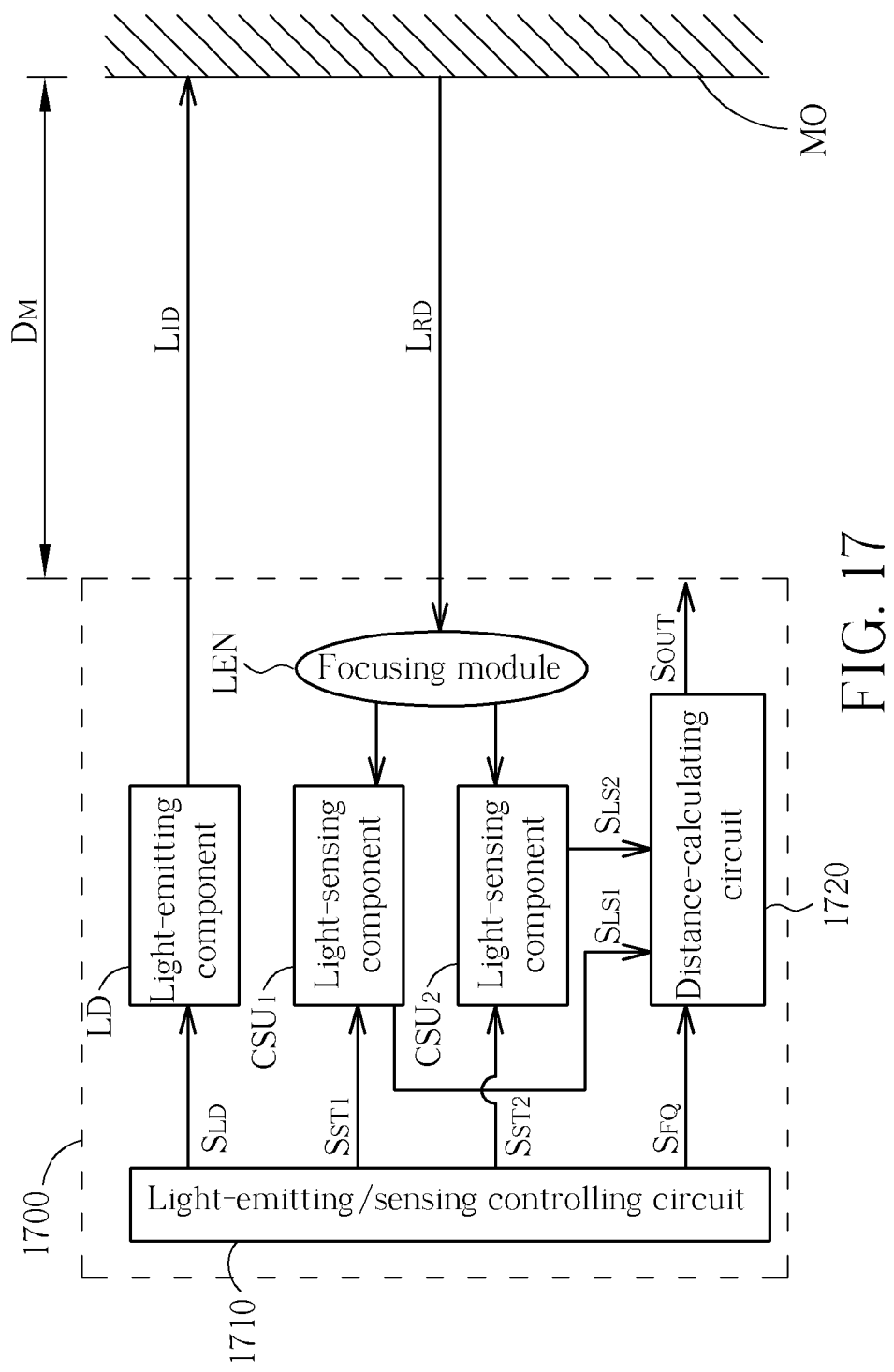

Please refer to FIG. 16. FIG. 16 is a diagram illustrating a method 1600 of increasing signal-to-noise ratio of the distance-measuring device according to another embodiment of the present invention. Please refer to FIG. 17. The method 1600 is applied for a distance-measuring device 1700. The distance-measuring device 1700 is utilized for measuring a measured distance $D_M$ between a measured object MO and the distance-measuring device 1700. The distance-measuring device 1700 includes a light-emitting/sensing controlling circuit 1710, a distance-calculating circuit 1720, a light-emitting component LD, a focusing module LEN, and light-sensing components $CSU_1$ and $CSU_2$. The structures and the operational principles of the light-emitting component LD and the focusing module LEN are similar to those of the light-emitting components 120, 520, 820, and 1020, and the focusing modules 170, 570, and 870, respectively. The light-sensing components $CSU_1$ and $CSU_2$ can be realized by the light-sensing components 531 and 532. The light-sensing component $CSU_1$ senses and accumulates energy of light according to a shutter periodic signal $S_{ST1}$, so as to generate a light-sensing signal $S_{LS1}$. The light-sensing component $CSU_2$ senses and accumulates energy of light according to a shutter periodic signal $S_{ST2}$, so as to generate a light-sensing signal $S_{LS2}$. The steps of the method 1600 are illustrated as below:

step 1610: by means of the light-emitting periodic signal $S_{LD}$, the light-emitting/sensing controlling circuit 1710 controls the light-emitting component LD to continuously emit a detecting light $L_{ID}$ to the measured object MO during an emitting period $T_{LD}$ for generating a reflected light $L_{RD}$;

step 1620: a delay period $T_{DELAY}$ after the light-emitting component LD starts to emit the detecting light $L_{ID}$, the light-emitting sensing controlling circuit 1610 switches the shutter periodic signal $S_{ST1}$ to represent "turning-on" during a sensing period $T_{SEN1}$ for the light-sensing component $CSU_1$ to sense and accumulate energy of the reflected light $L_{RD}$, and accordingly generate the light-sensing signal $S_{LS1}$;

step 1630: when the light-sensing component $CSU_1$ stops sensing the reflected light $L_{RD}$, the light-emitting/sensing controlling circuit 1710 switches the shutter periodic signal $S_{ST2}$ to represent "turning-on" during a sensing period $T_{SEN2}$ for the light-sensing component $CSU_2$ to sense and accumulate energy of the reflected light $L_{RD}$, and accordingly generate the light-sensing signal $S_{LS2}$;

step 1640: the distance-calculating circuit 1720 obtains a time of flight $T_{TOF}$ of light going back and forth between the distance-measuring device 1700 and the measured object MO according to the ratio between the light-sensing signals $S_{LS1}$ and $S_{LS2}$;

step 1650: the distance-calculating circuit 1720 obtains the measured distance $D_M$ according to the time of flight $T_{TOF}$, and accordingly generates an output signal $S_{OUT}$ for representing length of the measured distance $D_M$.

Figure 18:
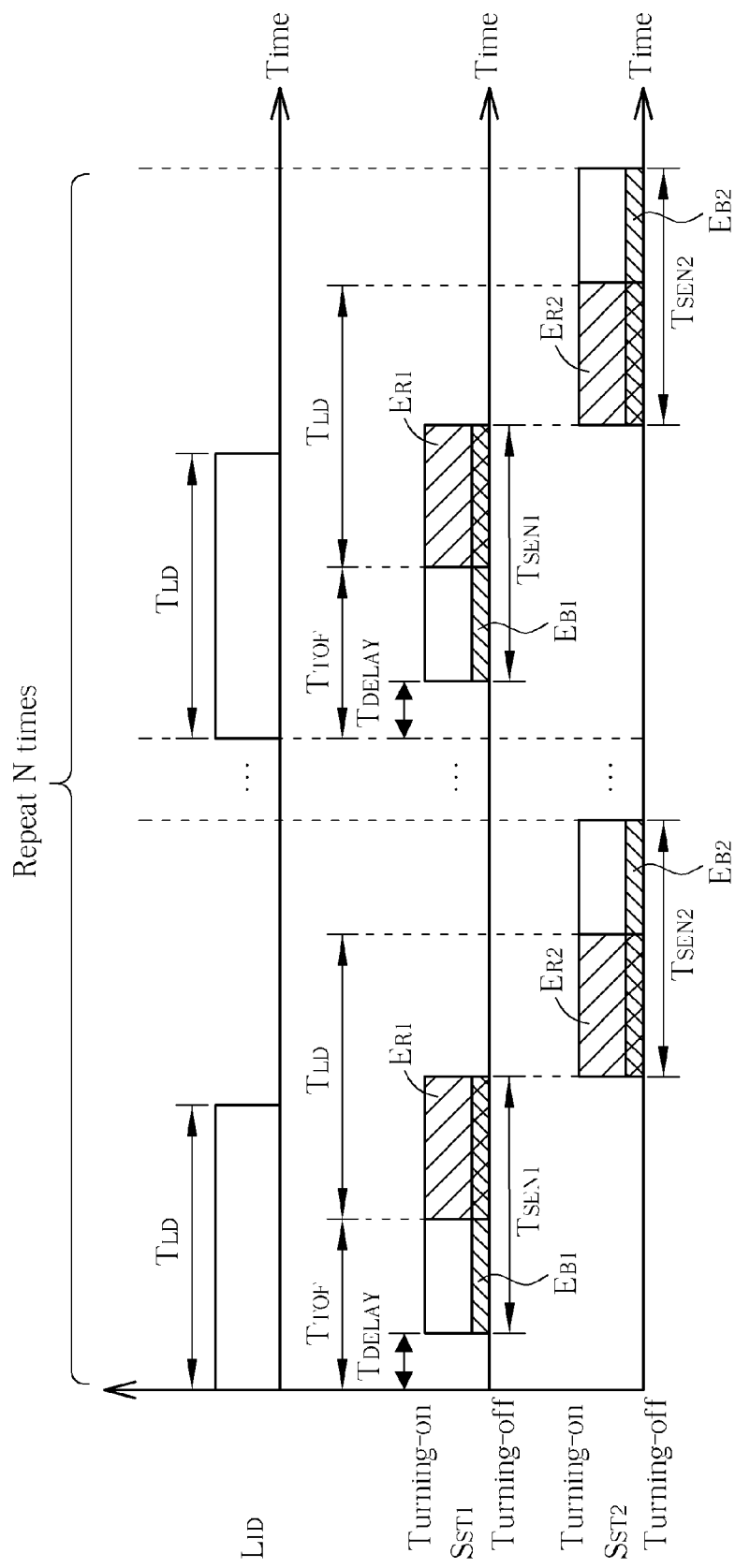

Please refer to FIG. 18. In the step 1610, by means of the light-emitting periodic signal $S_{LD}$, the light-emitting/sensing controlling circuit 1710 controls the light-emitting component LD to continuously emit a detecting light $L_{ID}$ to the measured object MO during an emitting period $T_{LD}$ for generating a reflected light $L_{RD}$. A time of flight $T_{TOF}$ after the light-emitting component LD starts to emit the detecting light $L_{ID}$, the reflected light $L_{RD}$ reaches the light-sensing component $CSU_1$. The time of flight $T_{TOF}$ is equal to the period of light going back and forth between the distance-measuring device 1700 and the measured object MO.

In the step 1620, a delay period $T_{DELAY}$ after the light-emitting component LD starts to emit the detecting light $L_{ID}$, the light-emitting sensing controlling circuit 1710 switches the shutter periodic signal $S_{ST1}$ to represent "turning-on" for a sensing period $T_{SEN1}$. Thus, the light-sensing component $CSU_1$ senses and accumulates energy of light and accordingly generates the light-sensing signal $S_{LS1}$. In the present embodiment, the length of the measured distance $D_M$ that the distance-measuring device 1700 can measure is limited between the predetermined shortest measured distance $D_{MIN}$ and the predetermined longest measured distance $D_{MAX}$. Therefore, in the step 1620, the light-emitting/sensing controlling circuit 1710 calculates the delay period $T_{DELAY}$ according to the formula (6) for the reflected light $L_{RD}$ to reach the light-sensing component $CSU_1$ after the delay period $T_{DELAY}$, so that the light-sensing component $CSU_1$ can sense the reflected light $L_{RD}$ in time to generate a correct light-sensing signal $S_{LS1}$. In addition, in FIG. 18, the reflected light $L_{RD}$ still has to reach the light-sensing component $CSU_1$ before the end of the sensing period $T_{SEN1}$ for the distance-measuring device 1700 to be capable of measuring the measured distance $D_M$. That is, the period length of the time of flight $T_{TOF}$ has to be shorter than the sum of period lengths of the sensing period $T_{SEN1}$ and the delay period $T_{DELAY}$. In other words, the predetermined longest measured distance $D_{MAX}$ that the distance-measuring device can measure can still be represented by the formula (8).

In the step 1630, when the light-sensing component $CSU_1$ stops sensing the reflected light $L_{RD}$, the light-emitting/sensing controlling circuit 1710 switches the shutter periodic signal $S_{ST2}$ to represent "turning-on" for a sensing period $T_{SEN2}$. Hence, in the sensing period $T_{SEN2}$, the light-sensing component $CSU_2$ senses and accumulates the energy of the reflected light $L_{RD}$, and accordingly generates the light-sensing signal $S_{LS2}$.

In the step 1640, the light-sensing signal $S_{LS1}$ represents the energy of the reflected light $L_{RD}$ sensed by the light-sensing component $CSU_1$. The light-sensing signal $S_{LS2}$ represents the energy of the reflected light $L_{RD}$ sensed by the light-sensing component $CSU_2$. According to the operational principle illustrated in FIG. 3, the distance-calculating circuit 1720 obtains the time of flight $T_{TOF}$ of the light going back and forth between the distance-measuring device 1700 and the measured object MO according to the ratio between the light-sensing signals $S_{LS1}$ and $S_{LS2}$. More particularly, it can be seen from FIG. 18 that the time of flight $T_{TOF}$ can be represented by the following formula:

$$T_{TOF} = T_{DELAY} + T_{SEN1} - [E_{R1}/(E_{R1} + E_{R2})] \times T_{LD} \quad (9)$$
$$= T_{DELAY} + T_{SEN1} -$$
$$[(S_{LS1} - E_{B1})/(S_{LS1} - E_{B1} + S_{LS2} - E_{B2})] \times T_{LD}.$$

When the distance-measuring device 1700 further includes a background-calculating circuit, the energy of the background light $E_{B1}$ and $E_{B2}$ can be calculated by means of the method illustrated in FIG. 2, so that the time of flight $T_{TOF}$ can be calculated according to the formula (9). In addition, when the energy of the background light $E_{B1}$ and $E_{B2}$ is much less than the energy of reflected light $E_{R1}$ and $E_{R2}$, the formula (9) can be simplified to be the following formula:

$$T_{TOF} = T_{DELAY} + T_{SEN1} - [(S_{LS1}/(S_{LS1} + S_{LS2})] \times T_{LD} \quad (10).$$

In the step 1650, since the period length of the time of flight $T_{TOF}$ is equal to that of the period of light going back and forth between the distance-measuring device 1700 and the measured object MO, the distance-calculating circuit 1720 can calculate the measured distance $D_M$ according to the formula (7), and accordingly generates the output signal $S_{OUT}$ representing the length of the measured distance $D_M$.

Compared with the method 1200 illustrated in FIG. 12, in the method 1600, the time of flight $T_{TOF}$ is calculated according to the ratio between the light-sensing signals $S_{LS1}$ and $S_{LS2}$. As a result, in the method 1600, the energy of the reflected light $L_{R1}$ and $L_{R2}$ can be repeatedly measured as shown in FIG. 18. When the energy of the reflected light $L_{R1}$ and $L_{R2}$ is measured N times, the light-sensing signals $S_{LS11} \sim S_{LS1N}$ and $S_{LS21} \sim S_{LS2N}$ are obtained. The distance-calculating circuit 1720 substitutes the light-sensing signal $S_{LS1}$ obtained by accumulating the light-sensing signals $S_{LD11} \sim S_{LD1N}$ and the light-sensing signal $S_{LS2}$ obtained by accumulating the light-sensing signals $S_{LS21} \sim S_{LS2N}$ into the formula (9) or (10) to calculate the time of flight $T_{TOF}$. In this way, the measuring error due to the low energy of reflected light $L_{RD}$ is reduced, so that the measured distance $D_M$ is more correctly calculated in the step 1650.

Figure 19:
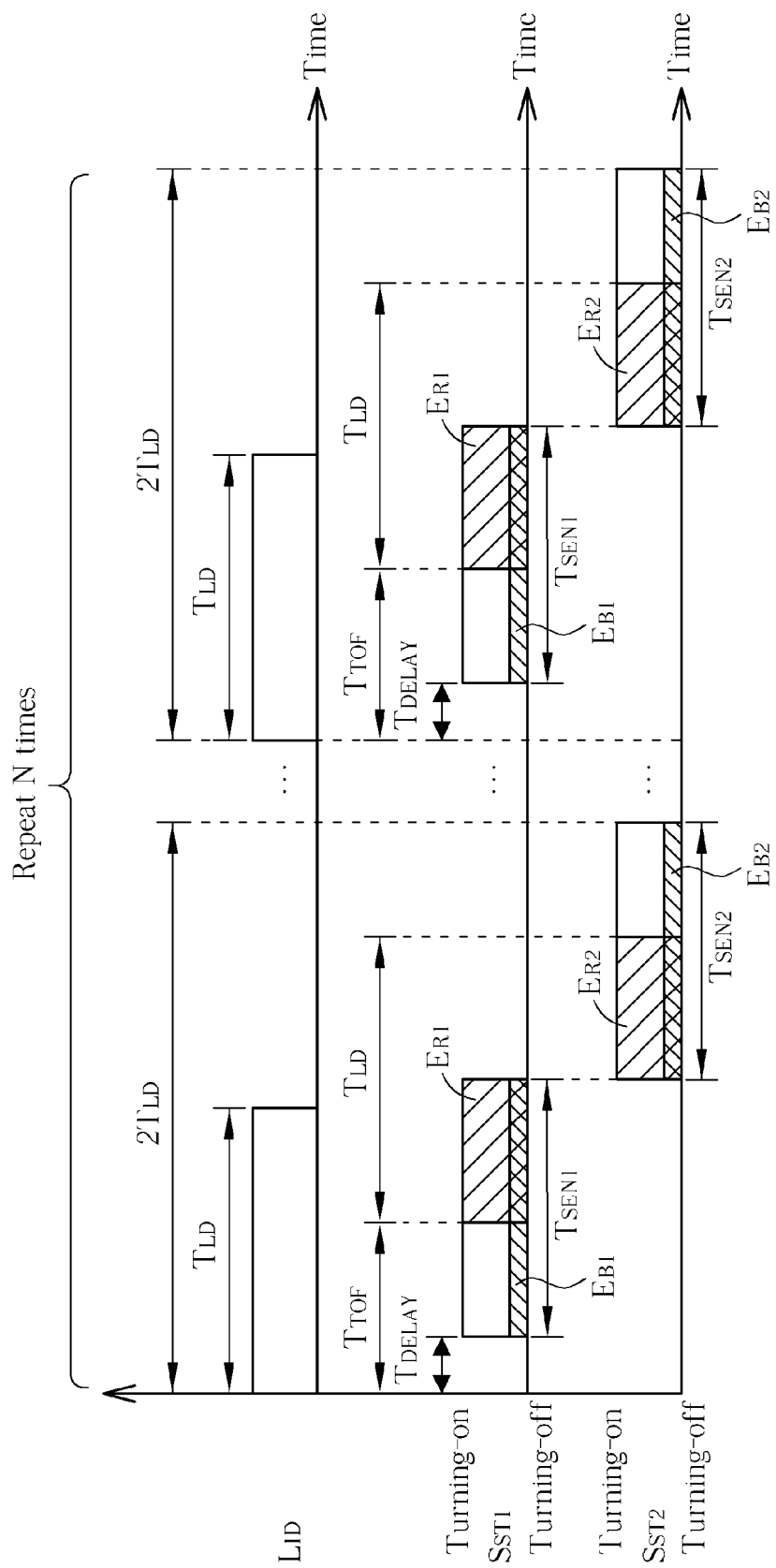

In addition, in the method 1600, the duty cycle of the light-emitting component LD emitting the detecting light $L_{ID}$ when the measured distance $D_M$ is measured, namely the ratio between the emitting period $T_{LD}$ and the detecting cycle $T_C$, can be controlled by setting the period lengths of the sensing periods $T_{SEN1}$ and $T_{SEN2}$, and the emitting period $T_{LD}$. For example, please refer to FIG. 19. The period length of detecting cycle $T_C$ is set to be $2T_{LD}$. The period length of the sensing period $T_{SEN1}$ and the sensing period $T_{SEN2}$ are both equal to $(T_{LD} - T_{DELAY}/2)$. In this way, the duty cycle of the light-emitting component LD emitting the detecting light $L_{ID}$ is equal to 50%.

Figure 20:
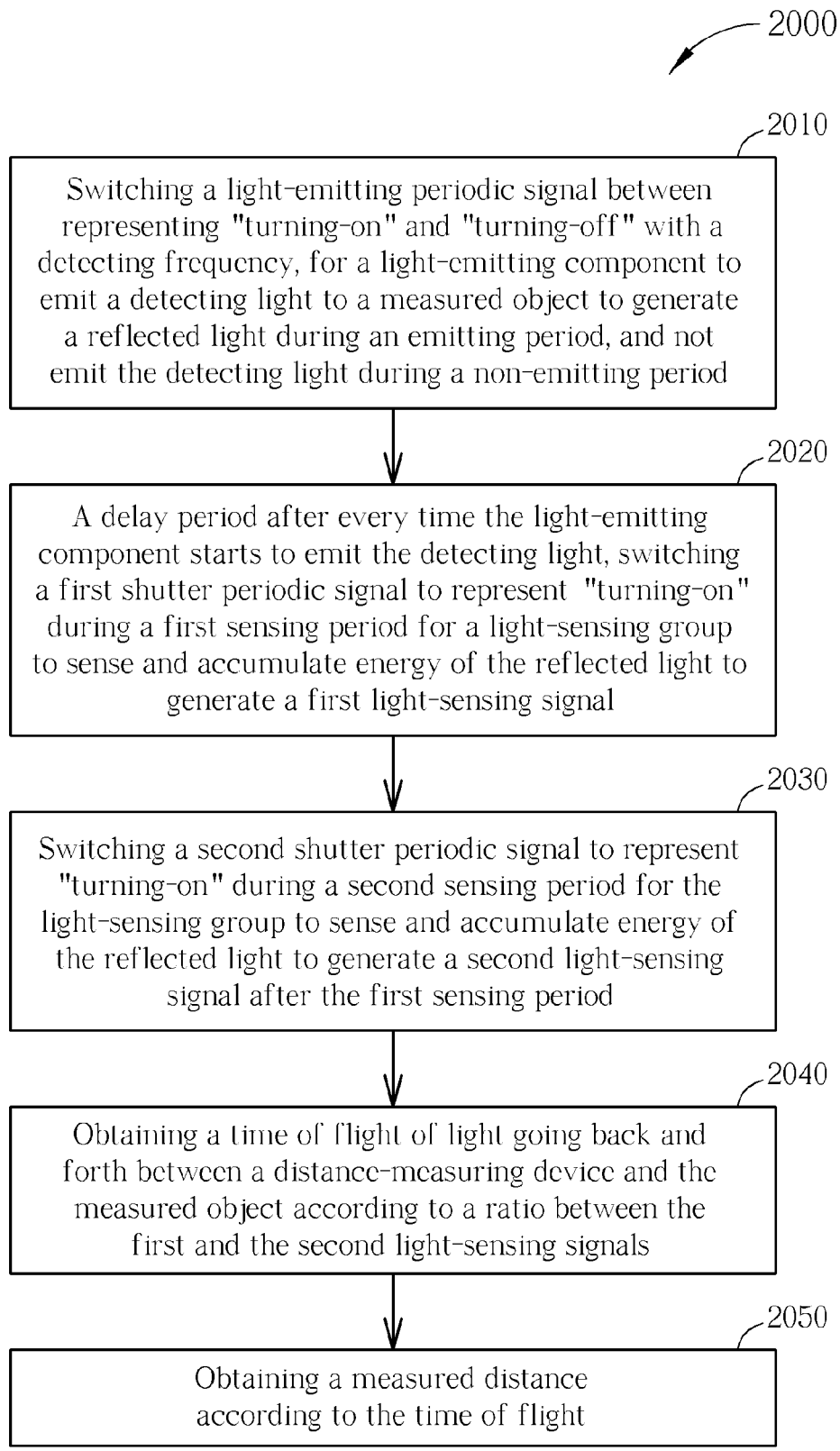
FIG. 20 and FIG. 21 are diagrams illustrating a method of increasing signal-to-noise ratio of the distance-measuring device of FIG. 1 according to another embodiment of the present invention.

Based on the spirit of the methods 1200 and 1600, the present invention further provides a method 2000 for the distance-measuring device 100 of FIG. 1. Please refer to FIG. 20 and FIG. 21, which are diagrams illustrating the method 2000 of increasing the signal-to-noise ratio of the distance-measuring device 100. The steps of the method 2000 are illustrated as below:

step 2010: the light-emitting/sensing controlling circuit 110 switches the light-emitting periodic signal $S_{LD}$ between representing "turning-on" and "turning-off" with a detecting frequency $F_C$, for the light-emitting component 120 to emit the detecting light $L_{ID}$ to the measured object MO to generate a reflected light $L_{RD}$ during an emitting period $T_{LD}$, and not emit the detecting light $L_{ID}$ during a non-emitting period $T_{NLD}$;

step 2020: a delay period $T_{DELAY}$ after every time the light-emitting component 120 starts to emit the detecting light $L_{ID}$, the light-emitting/sensing controlling circuit 110 switches the shutter periodic signal $S_{ST1}$ to represent "turning-on" during a sensing period $T_{SEN1}$ for the light-sensing group 130 to sense and accumulate energy of the reflected light $L_{RD}$ to generate the light-sensing signal $S_{LS1}$;

step 2030: the light-emitting/sensing controlling circuit 110 switches the shutter periodic signal $S_{ST2}$ to represent "turning-on" during a sensing period $T_{SEN2}$ for the light-sensing group 130 to sense and accumulate energy of the reflected light $L_{RD}$ to generate the light-sensing signal $S_{LS2}$ after the sensing period $T_{SEN1}$;

step 2040: the distance-calculating circuit 140 obtains a time of flight $T_{TOF}$ of light going back and forth between the distance-measuring device 100 and the measured object MO according to a ratio of the light-sensing signals $S_{LS1}$ and $S_{LS2}$;

step 2050: the distance-calculating circuit 140 obtains the measured distance MO according to the time of flight $T_{TOF}$, and accordingly generates an output signal $S_{OUT}$ (not shown in FIG. 1) representing the length of the measured distance $D_M$.

Figure 21:
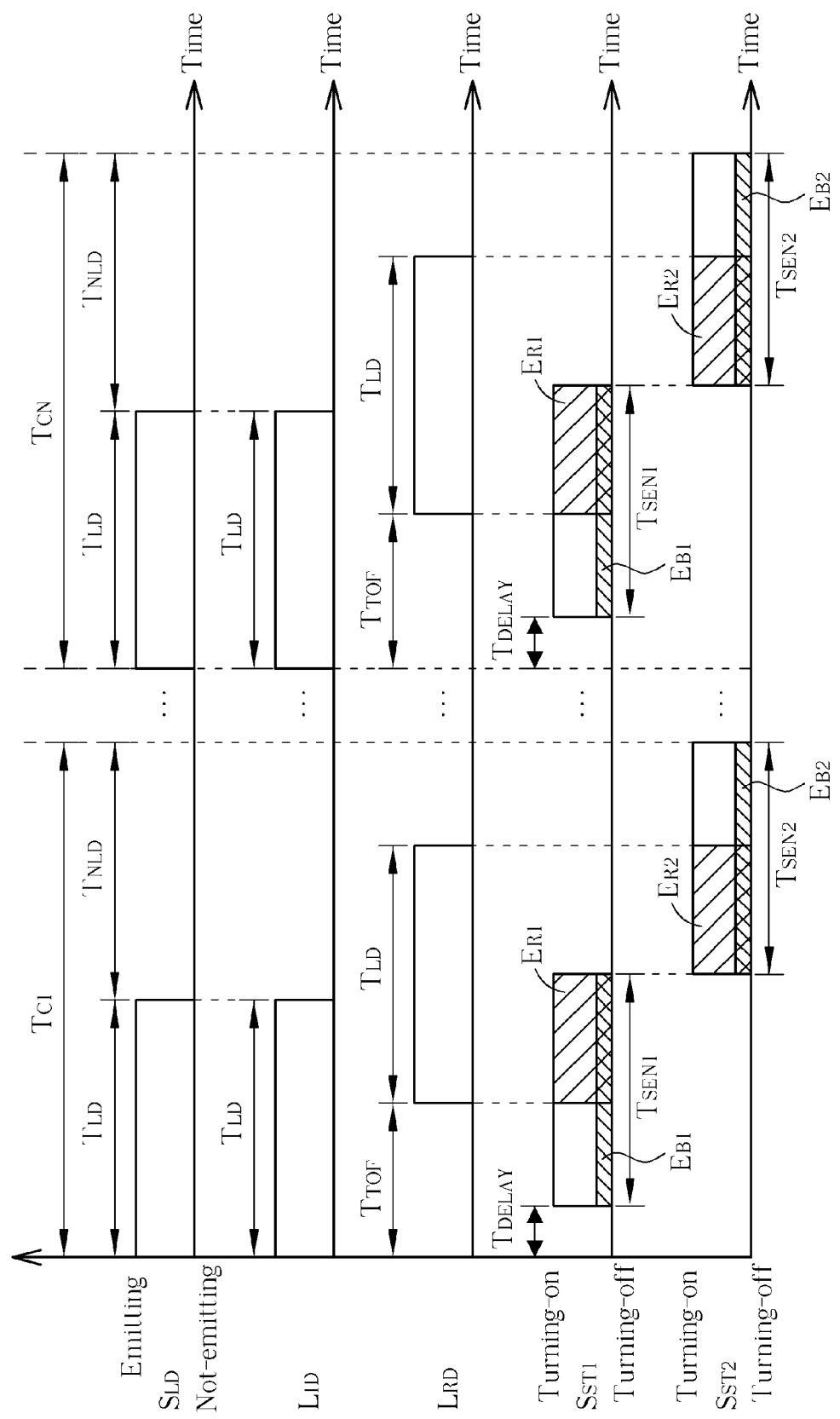

Please refer to FIG. 21. The period of the distance-measuring device 100 measuring the measured distance $D_M$ includes detecting cycles $T_{C1} \sim T_{CN}$. The period length of each detecting cycle $T_{C1} \sim T_{CN}$ is equal to $(1/F_C)$. In the step 2010, the light-emitting/sensing controlling circuit 110 switches the light-emitting periodic signal $S_{LD}$ between representing "turning-on" and "turning-off" with a detecting frequency $F_C$, for the light-emitting component 120 to emit the detecting light $L_{ID}$ to the measured object MO to generating a reflected light $L_{RD}$ during the emitting period $T_{LD}$ of each detecting cycle $T_{C1} \sim T_{ON}$, and not emit the detecting light $L_{ID}$ during the non-emitting period $T_{NLD}$ of each detecting cycle $T_{C1} \sim T_{ON}$. Thus, in each detecting cycle $T_{C1} \sim T_{ON}$, the measured object MO reflects the detecting light $L_{ID}$ to generate reflected light $L_{RD}$. More particularly, a time of flight $T_{TOF}$ after the light-emitting component 120 starts to emit the detecting light $LI_D$, the reflected light $L_{RD}$ reaches the light-sensing group 130, wherein the time of flight $T_{TOF}$ is equal to the period of light going back and forth between the distance-measuring device 100 and measured object MO.

In the step 2020, in each detecting cycle $T_{C1} \sim T_{CN}$, a delay period $T_{DELAY}$ after every time the light-emitting component 120 starts to emit the detecting light $L_{ID}$, the light-emitting/sensing controlling circuit 110 switches the shutter periodic signal $S_{ST1}$ to represent "turning-on" during a sensing period $T_{SEN1}$ for the light-sensing group 130 to sense and accumulate energy of the reflected light $L_{RD}$ to generate the light-sensing signal $S_{LS1}$. Provided that the measured distance $D_M$ is limited to between the predetermined shortest measured distance $D_{MIN}$ and the predetermined longest measured distance $D_{MAX}$, in the step 2020, the light-emitting/sensing controlling circuit 110 calculates the delay period $T_{DELAY}$ according to the formula (6) for the reflected light $L_{RD}$ to reach the light-sensing component $CSU_1$ after the delay period $T_{DELAY}$, so that the light-sensing component $CSU_1$ can sense the reflected light $L_{RD}$ in time to generate a correct light-sensing signal $S_{LS1}$. In addition, the reflected light $L_{RD}$ still has to reach the light-sensing component $CSU_1$ before the end of the sensing period $T_{SEN1}$ for the light-sensing group 130 to be capable of sensing the reflected light $L_{RD}$. Hence, the predetermined longest measured distance $D_{MAX}$ that the distance-measuring device can measure can still be represented by the formula (8).

In the step 2030, after the sensing period $T_{SEN1}$ of each detecting cycle $T_{C1} \sim T_{CN}$, the light-emitting/sensing controlling circuit 110 switches the shutter periodic signal $S_{ST2}$ to represent "turning-on" during a sensing period $T_{SEN2}$. Hence, in the sensing period $T_{SEN2}$, the light-sensing group 130 senses and accumulates the energy of the reflected light $L_{RD}$, and accordingly generates the light-sensing signal $S_{LS2}$. In addition, it can be seen in FIG. 21 that the light-emitting periodic signal $S_{LD}$ and the shutter periodic signal $S_{ST1}$ are approximately in phase (the only difference is the delay period $T_{DELAY}$), and the phase of the shutter periodic signal $S_{ST1}$ (or the light-emitting periodic signal $S_{LD}$) is approximately opposite the phase of the second shutter periodic signal $S_{ST2}$.

In the step 2040, the light-sensing signal $S_{LS1}$ represents the energy of the reflected light $L_{RD}$ sensed by the light-sensing group 130 in the sensing periods $T_{SEN1}$. The light-sensing signal $S_{LS2}$ represents the energy of the reflected light $L_{RD}$ sensed by the light-sensing group 130 in the sensing periods $T_{SEN2}$. Similar to the step 1640, the distance-calculating circuit 140 obtains the time of flight $T_{TOF}$ of the light going back and forth between the distance-measuring device 100 and the measured object MO according to the ratio between the light-sensing signals $S_{LS1}$ and $S_{LS2}$. That is, in the step 2040, the distance-calculating circuit 140 can still calculate the time of flight $T_{TOF}$ according to the formula (9).

In addition, since the distance-measuring device 100 can obtain the background signal $S_B$, which represents the energy of background light $L_B$ sensed by the light-sensing group 130 per unit time, by means of the method illustrated in FIG. 2, the energy of background light $E_{B1}$ and $E_{B2}$ in FIG. 21 can be calculated according to the following formulas:

$$E_{B1} = S_B \times T_{SEN1} \qquad (11); \text{ and}$$

$$E_{B2} = S_B \times T_{SEN2} \qquad (12).$$

In this way, according to the formulas (9), (11), and (12), the time of flight $T_{TOF}$ can be calculated by the following formula:

$$T_{TOF} = T_{DELAY} + T_{SEN1} - [(S_{LS1} - S_B \times T_{SEN1})/(S_{LS1} - S_B \times T_{SEN1} + S_{LS2} - S_B \times T_{SEN2})] \times T_{LD} \qquad (13).$$

Therefore, from the formula (13), the distance-calculating circuit 140 can calibrate the ratio between the light-sensing signals $S_{LS1}$ and $S_{LS2}$ according to the background signal $S_B$, and can obtain a more correct time of flight $T_{TOF}$ according to the calibrated ratio between the light-sensing signals $S_{LS1}$ and $S_{LS2}$.

In the step 2050, since the time of flight $T_{TOF}$ is equal to the period of the light going back and forth between the distance-measuring device 100 and the measured object MO, the distance-calculating circuit 140 can calculate the measured distance $D_M$ according to the formulas (7) and (13), and accordingly generate the output signal $S_{OUT}$ (not shown in FIG. 1) representing the length of the measured distance $D_M$.

In conclusion, the method provided by the present invention is capable of increasing the signal-to-noise ratio of the distance-measuring device. The method provided by the present invention includes a light-emitting component emitting a detecting light to a measured object during an emitting period for generating a reflected light, a delay period after the light-emitting component emitting the detecting light, a light-sensing component sensing the energy of the reflected light so as to generate a light-sensing signal, obtaining a time of flight of light going back and forth between the distance-measuring device and the measured object according to the energy of the detecting light and the light-sensing signal, and obtaining a measured distance between the distance-measuring device and the measured object according to the time of flight. Since the measured distance is larger than a predetermined shortest measured distance, the method can accordingly calculate a proper delay period for ensuring that the reflected light reaches the light-sensing component after the delay period. In this way, since the light-sensing component does not sense the background light during the delay period, the signal-to-noise ratio of the light-sensing signal is improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of increasing signal-to-noise ratio of a distance-measuring device, the distance-measuring device being utilized for measuring a measured distance between the distance-measuring device and a measured object, the measured distance being longer than a predetermined shortest measured distance and shorter than a predetermined longest measured distance, the distance-measuring device having a light-emitting component for emitting a detecting light, and a first light-sensing component for sensing and accumulating energy of light according to a first shutter periodic signal to generate a light-sensing signal, the method comprising:

the light-emitting component continuously emitting the detecting light to the measured object to generate a reflected light during an emitting period;

a delay period after the light-emitting component starts to emit the detecting light, the first light-sensing component sensing and accumulating energy of the reflected light during a sensing period to generate the light-sensing signal;

obtaining a time of flight of light going back and forth between the distance-measuring device and the measured object according to the light-sensing signal and energy of the detecting light emitted by the light-emitting component during the emitting period; and obtaining the measured distance according to the time of flight;

wherein:

the delay period is calculated according to the predetermined shortest measured distance;

a relationship between the predetermined longest measured distance and the sensing period is represented by $D_{MAX}=2\times(T_{SEN1}+T_{DELAY})/C$;

$D_{MAX}$ represents the predetermined longest measured distance;

$T_{SEN1}$ represents the sensing period;

$T_{DELAY}$ represents the delay period; and

C represents speed of light.

2. The method of claim 1, wherein obtaining the measured distance according to the time of flight comprises:

calculating the measured distance according to the following formula:

$$D_M = T_{TOF} \times C/2;$$

wherein $D_M$ represents the measured distance; $T_{TOF}$ represents the time of flight; and C represents speed of light.

3. The method of claim 1, wherein a sum of period lengths of the sensing period and the delay period is equal to period length of the emitting period.

4. The method of claim 1, wherein period length of the sensing period is equal to period length of the emitting period.

5. The method of claim 1, further comprising calculating the delay period according to $T_{DELAY}=2\times D_{MIN}/C$, wherein $D_{MIN}$ represents the predetermined shortest measured distance.

6. A distance-measuring device with increased signal-to-noise ratio, the distance-measuring device being utilized for measuring a measured distance between the distance-measuring device and a measured object, the measured distance being longer than a predetermined shortest measured distance and shorter than a predetermined longest measured distance, the distance-measuring device comprising:

an emitting component, for emitting a detecting light;

a light-sensing component, for sensing and accumulating energy of light to generate a light-sensing signal;

a controlling circuit, for controlling the emitting component to continuously emit the detecting light to the measured object to generate a reflected light during an emitting period, and a delay period after the light-emitting component starts to emit the detecting light, for controlling the light-sensing component to sense and accumulate energy of the reflected light during a sensing period to generate the light-sensing signal; and a calculating circuit, for obtaining a time of flight of light going back and forth between the distance-measuring device and the measured object according to the light-sensing signal and energy of the detecting light emitted by the light-emitting component during the emitting period, and generating an output signal representing length of the measured distance according to the time of flight; wherein:

the delay period is calculated according to the predetermined shortest measured distance;

a relationship between the predetermined longest measured distance and the sensing period is represented by $D_{MAX}=2\times(T_{SEN1}+T_{DELAY})/C$;

$D_{MAX}$ represents the predetermined longest measured distance;

$T_{SEN1}$ represents the sensing period;

$T_{DELAY}$ represents the delay period; and

C represents speed of light.

7. The distance-measuring device of claim 6, wherein the distance-calculating circuit calculates the measured distance according to the following formula:

$$D_M = T_{TOF} \times C/2;$$

wherein $D_M$ represents the measured distance; $T_{TOF}$ represents the time of flight; and C represents speed of light.

8. The distance-measuring device of claim 6, wherein a sum of period lengths of the sensing period and the delay period is equal to period length of the emitting period.

9. The distance-measuring device of claim 6, wherein period length of the sensing period is equal to period length of the emitting period.

10. The distance-measuring device of claim 6, further comprising:

a focusing module, for focusing the reflected light onto the-light-sensing component.

11. The distance-measuring device of claim 6, wherein the calculating circuit is configured to calculate the delay period according to $T_{DELAY}=2\times D_{MIN}/C$, wherein $D_{MIN}$ represents the predetermined shortest measured distance.

* * * * *